(12) United States Patent
Zhang et al.

(10) Patent No.: US 11,858,332 B2
(45) Date of Patent: Jan. 2, 2024

(54) BATTERY, POWER CONSUMPTION APPARATUS, AND METHOD FOR PRODUCING BATTERY

(71) Applicant: CONTEMPORARY AMPEREX TECHNOLOGY CO., LIMITED, Ningde (CN)

(72) Inventors: Wenhui Zhang, Ningde (CN); Kangyu Wang, Ningde (CN); Mu Qian, Ningde (CN); Wencai Xu, Ningde (CN); Zengzhong Wang, Ningde (CN); Jinqing Ji, Ningde (CN)

(73) Assignee: CONTEMPORARY AMPEREX TECHNOLOGY CO., LIMITED, Ningde (CN)

( * ) Notice: Subject to any disclaimer, the term of this patent is extended or adjusted under 35 U.S.C. 154(b) by 248 days.

(21) Appl. No.: 17/532,284

(22) Filed: Nov. 22, 2021

(65) Prior Publication Data
US 2022/0185088 A1 Jun. 16, 2022

Related U.S. Application Data

(63) Continuation of application No. PCT/CN2020/135944, filed on Dec. 11, 2020.

(51) Int. Cl.
*B60K 1/04* (2019.01)
*H01M 50/209* (2021.01)
(Continued)

(52) U.S. Cl.
CPC ............... *B60K 1/04* (2013.01); *B60L 50/64* (2019.02); *H01M 50/209* (2021.01);
(Continued)

(58) Field of Classification Search
CPC ... B60K 1/04; B60K 2001/0438; B60L 50/64; H01M 50/209; H01M 50/244; H01M 50/26; H01M 50/264; H01M 2220/20
See application file for complete search history.

(56) References Cited

U.S. PATENT DOCUMENTS 8,243,458 B2 * 8/2012 Chen ................ H04M 1/18
361/728
8,808,031 B2 * 8/2014 Zhao ................ H01M 10/425
439/620.33
(Continued)

FOREIGN PATENT DOCUMENTS

CN 205159404 U 4/2016
CN 206250253 U 6/2017
(Continued)

OTHER PUBLICATIONS

First Office Action dated Apr. 22, 2023 received in Chinese Patent Application No. CN 202080079338.4.
(Continued)

*Primary Examiner* — Jason D Shanske
*Assistant Examiner* — James J Triggs
(74) *Attorney, Agent, or Firm* — Scully, Scott, Murphy & Presser, P.C.

(57) ABSTRACT

The present application provides a battery, a power consumption apparatus, and a method for producing a battery. The battery includes a box body, a battery module and a mounting plate, the battery module is disposed in the box body and includes a battery cell arrangement structure and a first end plate, the battery cell arrangement structure includes a plurality of battery cells stacked and is disposed on one side of the battery cell arrangement structure, the first end plate is fixedly connected to the battery cell arrangement structure, the mounting plate is disposed between the first end plate and the box body and is fixedly connected to the (Continued)

box body; the first end plate has a first elastic support part configured to be capable of abutting the mounting plate, being squeezed by the battery cell arrangement structure and deforming when the battery cell arrangement structure expands.

19 Claims, 9 Drawing Sheets

(51) Int. Cl.
    *H01M 50/244*     (2021.01)
    *H01M 50/264*     (2021.01)
    *B60L 50/64*     (2019.01)
    *H01M 50/26*     (2021.01)

(52) U.S. Cl.
    CPC ......... *H01M 50/244* (2021.01); *H01M 50/26* (2021.01); *H01M 50/264* (2021.01); *H01M 2220/20* (2013.01)

(56) References Cited

U.S. PATENT DOCUMENTS

| | | | |
|---|---|---|---|
| 9,083,029 B2* | 7/2015 | Lee | H01M 50/264 |
| 9,666,378 B2* | 5/2017 | Hayashida | H01M 10/486 |
| 9,893,327 B2* | 2/2018 | Kobayashi | H01M 10/0468 |
| 9,966,637 B2* | 5/2018 | Cho | H01M 50/249 |
| 10,011,162 B2* | 7/2018 | Yoon | H01M 50/296 |
| 10,109,830 B2* | 10/2018 | Ochi | H01M 10/6557 |
| 11,764,435 B2* | 9/2023 | Lee | H01M 10/48 |
| | | | 429/158 |
| 2007/0093090 A1* | 4/2007 | Fujimaki | H01H 50/043 |
| | | | 439/76.2 |
| 2008/0180884 A1* | 7/2008 | Parrish | B60R 16/0238 |
| | | | 361/624 |
| 2009/0017367 A1* | 1/2009 | Marubayashi | H01M 6/42 |
| | | | 429/99 |
| 2013/0101883 A1* | 4/2013 | Zhao | H01M 50/543 |
| | | | 429/121 |
| 2014/0192457 A1* | 7/2014 | Zhao | H01R 11/09 |
| | | | 361/624 |
| 2017/0194681 A1* | 7/2017 | Kim | H01M 50/271 |
| 2018/0183025 A1* | 6/2018 | Cao | H01M 50/227 |
| 2020/0194753 A1* | 6/2020 | Fujiwara | H01M 10/48 |
| 2020/0212387 A1* | 7/2020 | Su | H01M 50/209 |
| 2022/0109212 A1* | 4/2022 | Bai | H01M 50/164 |

FOREIGN PATENT DOCUMENTS

| | | |
|---|---|---|
| CN | 207441797 U | 6/2018 |
| CN | 208127274 U | 11/2018 |
| CN | 209016140 U | 6/2019 |
| CN | 210837870 U | 6/2020 |
| CN | 211017197 U | 7/2020 |
| CN | 211017216 U | 7/2020 |
| CN | 211879464 U | 11/2020 |
| EP | 3343667 A1 | 7/2018 |
| EP | 3675216 A1 | 7/2020 |
| WO | 2019001357 A1 | 1/2019 |

OTHER PUBLICATIONS

Extended European Search Report dated Jun. 20, 2022 received in European Patent Application No. EP 20934239.3.

\* cited by examiner

BATTERY, POWER CONSUMPTION APPARATUS, AND METHOD FOR PRODUCING BATTERY

CROSS-REFERENCE TO RELATED APPLICATIONS

This application is a continuation of International Application No. PCT/CN2020/135944, filed on Dec. 11, 2020, the disclosure of which is hereby incorporated by reference in its entirety.

TECHNICAL FIELD

The present application relates to the field of battery technologies, and in particular, to a battery, a power consumption apparatus, and a method for producing a battery.

BACKGROUND

In the prior art, locking with a bolt is used between a battery module and a box body of a battery, so that the battery module and the box body are rigidly connected. During expansion of the battery module, the box body may deform under the action of an expansion force, resulting in deformation of the battery box and an increase in contour dimension of the battery box body, and affecting assembly and the service life of the battery. Moreover, battery cells are squeezed by an inner wall of the box body during the expansion, and a phenomenon of lithium plating may occur, resulting in a dive of battery capacity.

SUMMARY

Embodiments of the present application are intended to provide a battery, a power consumption apparatus, and a method for producing a battery. In this battery, expansion space could be provided for a battery module, and a box body does not easily deform.

In a first aspect, an embodiment of the present application provides a battery. The battery includes a box body, a battery module and a mounting plate, the battery module is disposed in the box body and includes a battery cell arrangement structure and a first end plate, the battery cell arrangement structure includes a plurality of battery cells stacked along a first direction, the first end plate is disposed on one side of the battery cell arrangement structure, the first end plate is fixedly connected to the battery cell arrangement structure, the mounting plate is disposed between the first end plate and the box body, and the mounting plate is fixedly connected to the box body; and the first end plate has a first elastic support part, and the first elastic support part is configured to be capable of abutting the mounting plate, being squeezed by the battery cell arrangement structure and deforming when the battery cell arrangement structure expands to provide expansion space for the battery cell arrangement structure.

In the foregoing technical solution, the first elastic support part provides the expansion space through its own deformation, and the deformation is reliable, which could provide the expansion space for the battery cell arrangement structure in time (that is, the expansion space is provided for the battery module) to release an expansion force of the battery cell arrangement structure, could reduce possibility of deformation of the box body caused by the expansion force, and improves reliability of assembly and the service life of the box body. Meanwhile, by releasing the expansion force, possibility of occurrence of lithium plating in the battery cells caused by an excessive squeezing force between the mounting plate and the first end plate could be reduced, which is beneficial to normal operation of the battery.

In addition, due to the provision of the mounting plate, it is benefit for adding a molding manner of the box body. For example, by providing the mounting plate, the box body may be molded by means of a die-casting process. By reasonably designing a structure of the mounting plate and arranging its position on the box body, it is benefit for offsetting a draft angle of the box body to facilitate construction of a restraint structure between the battery module and the box body, so as to realize restraint of the battery module in the box body.

Optionally, the box body includes a first wall and a second wall, the second wall is connected to the first wall and extends upward, the battery module is located above the first wall, and the mounting plate is disposed between the first end plate and the second wall.

In the foregoing technical solution, the expansion space is provided between the first end plate and the mounting plate for the battery cell arrangement structure through the deformation of the first elastic support part, which could reduce a squeezing force of the battery module to the second wall of the box body.

Optionally, the mounting plate is connected to the second wall through a first fastener to fix the mounting plate to the box body.

Optionally, a restraint groove with an opening facing upward is disposed in the box body, and a lower end of the mounting plate is plugged into the restraint groove.

In the foregoing technical solution, the lower end of the mounting plate is restrained in the box body, which improves reliability of the connection between the mounting plate and the box body.

Optionally, a restraint member is disposed in the box body, the restraint member has an upright part, and the restraint groove is restricted between the upright part and the second wall.

Optionally, the mounting plate includes a mounting plate body and a first extending part, the first extending part extends from the mounting plate body toward the second wall, and the first extending part is fixedly connected to the second wall.

In the foregoing technical solution, by providing the first extending part, it facilitates the connection between the mounting plate and the second wall. In addition, due to the provision of the first extending part, the mounting plate body could be connected to the second wall through the first extending part when arranged in an upright direction. In this way, a draft angle of the second wall could be offset, and the connection between the mounting plate and the box body is conveniently realized.

Optionally, the first extending part is fixedly connected to an upper surface of the second wall to facilitate operation and be benefit for simplifying the connection structure therebetween.

Optionally, the mounting plate further includes a second extending part, the second extending part extends from the mounting plate body toward the second wall and abuts the second wall, and the second extending part and the first extending part are spaced apart in an up-down direction.

In the foregoing technical solution, by providing the second extending part, connection points between the mounting plate and the second wall in the up-down direction are increased, and reliability of the connection between the mounting plate and the second wall is improved.

Optionally, rigidity of the mounting plate is greater than rigidity of the first end plate, so that when the battery cell arrangement structure expands, the first end plate easily deforms to provide expansion space for the battery module. Meanwhile, the rigidity of the mounting plate meets the requirements, which plays a role in reliably mounting the battery module in the box body.

Optionally, the mounting plate is made of a metal material, and the first end plate is made of a non-metal material.

Optionally, a height of the mounting plate is not smaller than a height of the battery cell arrangement structure, and the height of the mounting plate is greater than a height of the second wall.

Optionally, the battery further includes a second end plate, the second end plate is disposed opposite to the first end plate along the first direction, the battery cell arrangement structure is located between the first end plate and the second end plate, and the second end plate is fixedly connected to both the battery cell arrangement structure and the box body.

In the foregoing technical solution, deformation space is provided between one end of the battery module in the first direction and the box body through the first elastic support part, and the other end of the battery module in the first direction is rigidly connected to the box body. When the battery cell arrangement structure expands, it expands toward one end at which the first end plate is located, the battery module could expand in a preset direction while the release of the expansion force of the battery cell arrangement structure is realized, and squeeze and deformation of a side wall of the box body at the other end of the battery module could be avoided at the same time.

Optionally, rigidity of the second end plate is greater than rigidity of the first end plate, so that when the battery cell arrangement structure expands, the second end plate does not easily deform, the first end plate easily deforms, and the battery module expands toward the first end plate more easily.

Optionally, the second end plate is made of a metal material, and the first end plate is made of a non-metal material.

Optionally, at least a portion of the first elastic support part obliquely extends upward toward the mounting plate.

In the foregoing technical solution, when the first end plate is squeezed, since the first elastic support part has an inclined angle, the first elastic support part deforms more easily when squeezed by the mounting plate, which could provide the expansion space for the battery cell arrangement structure in time.

Optionally, the first end plate further includes an end plate body, the end plate body has a first surface facing the battery cell arrangement structure and a second surface facing away from the battery cell arrangement structure, and the first elastic support part is disposed on the second surface.

In the foregoing technical solution, the second surface is a large face of the end plate body, which facilitates the provision of the first elastic support part. In addition, since the second surface is a large face, it facilitates arrangement of more first elastic support parts, which is benefit for dispersing the expansion force of the battery cell arrangement structure, and reduces the possibility of occurrence of lithium plating due to squeeze of the battery cells caused by concentration of the squeezing force.

Optionally, an orthographic projection of the first elastic support part on a horizontal plane is in a long strip shape, a face on which one long side of the long strip shape is located is connected to the second surface, and a face on which the other long side of the long strip shape is located abuts the mounting plate, so as to disperse the expansion force of the battery cell arrangement structure in a length direction of the first end plate.

Optionally, the first elastic support part is multiple in quantity, and the multiple first elastic support parts are arranged at intervals on the second surface along an up-down direction, which is benefit for evenly dispersing the expansion force, improves consistency of forces that positions on a face where the battery cell arrangement structure is in contact with the first end plate are subjected to, and improves consistency of forces that the battery cells are subjected to.

Optionally, the box body further includes a third wall, the third wall is connected to the first wall and extends upward, the third wall is disposed opposite to the second wall along the first direction, and the first elastic support part abuts the mounting plate when the battery cell arrangement structure does not expand to realize locating of the battery module in the first direction.

In the foregoing technical solution, after the battery module is mounted in the box body, the first elastic support part of the first end plate abuts the mounting plate, and the second end plate is fixedly connected to the third wall, which could provide mounting locating in the first direction for the battery module, and ensures reliability of the mounting of the battery module in the first direction.

Optionally, the battery module is in an interference fit with the box body, and the first elastic support part is configured to absorb a magnitude of interference in the first direction through generation of elastic deformation.

In the foregoing technical solution, when the battery cell arrangement structure does not expand, the first elastic support part abuts on the mounting plate and is in a deformed stated. In addition to the advantage of providing the mounting locating in the first direction for the battery module mentioned above, this setting has at least the following two advantages: first, after the battery module is assembled in place, the first elastic support part provides an assembly margin in the first direction for the battery module, so that a dimension error of the battery module in the first direction can be offset by the deformation of the first elastic support part. For example, when a dimension of the battery module in the first direction is greater than a mounting dimension of the box body in the corresponding direction, it can be realized that the battery module is smoothly mounted in the box body through the deformation of the first elastic support part. Therefore, requirements on processing and assembly accuracy of the battery module in the first direction are reduced. Second, after the battery module is assembled in place, since the first elastic support part is in a deformed state, a reaction force of the mounting plate could be transferred to the battery cell arrangement structure. The battery cells are subjected to a certain pressure, which is benefit for ensuring good contact between interfaces of positive electrode sheets and negative electrode sheets inside the battery cells.

Optionally, the box body further includes a pair of fourth walls, the pair of fourth walls are both connected to the first wall and extend upward, the pair of fourth walls are disposed opposite to each other along a second direction, and the second direction intersects with the first direction; and the first end plate further includes a second elastic support part, and the second elastic support part is configured to abut the fourth wall to realize locating of the battery module in the second direction.

For this reason, after the battery module is mounted in the box body, the second elastic support part abuts the fourth wall, which could provide mounting locating in the second direction for the battery module, and ensures the reliability of the mounting of the battery module in the second direction.

Optionally, the mounting plate is provided with a first restraint face, and the first restraint face is configured to abut the first end plate to limit the first end plate to move upward.

The first restraint face limits the first end plate to freely move upward, which ensures mounting positions of the first end plate and the battery module in the up-down direction (that is, a height direction of the first end plate), and avoids affecting normal operation of the battery module due to the upward movement of the battery module. For this reason, it is possible to omit locking with a bolt between the first end plate and the mounting plate, which is benefit for reducing the use of parts, and improves utilization of space inside the box body. Moreover, since locking with a bolt is omitted, the rigid connection between the first end plate and the mounting plate is avoided, so that it is possible to provide the expansion space for the expansion of the battery module.

Optionally, a face of the mounting plate facing the first end plate is partially recessed to form a groove, and an upper side wall of the groove is the first restraint face.

In the foregoing technical solution, the manner of constructing the first restraint face through the upper side wall of the groove is beneficial to weight reduction of the box body while the space of the box body for accommodating the battery module is not occupied.

Optionally, the first end plate is provided with a first restraint protrusion, and an upper surface of the first restraint protrusion is configured to abut the first restraint face to limit the first end plate to move upward.

In the foregoing technical solution, the manner in which the first restraint protrusion abuts the first restraint face for restraint realizes that the first end plate and the mounting plate are reliably restrained, and compared with the manner of locking with a bolt, it further has the advantages of simple structure, convenient mounting of the battery module in the box body, and the like.

Optionally, the first restraint protrusion horizontally extends toward the mounting plate.

In the foregoing technical solution, when the battery module expands, the direction in which the first restraint protrusion may move (upward) is perpendicular to the extending direction, so that it is not easy to slide between the first restraint protrusion and the first restraint face, which could improve reliability of restraint of the first restraint protrusion and the first restraint face.

Optionally, a gap is provided between the upper surface of the first restraint protrusion and the first restraint face in an up-down direction when the battery cell arrangement structure does not expand.

In the foregoing technical solution, since there is a gap in the up-down direction, the first restraint face does not interfere with the horizontal movement of the first restraint protrusion, which is benefit for smoothly moving the first restraint protrusion to a bottom of the first restraint face.

Optionally, the first end plate further includes an end plate body, the end plate body has a first surface facing the battery cell arrangement structure and a second surface facing away from the battery cell arrangement structure, and the first restraint protrusion is disposed on the second surface.

In the foregoing technical solution, the second surface is a large face of the first end plate, which facilitates the provision of a second restraint protrusion. Moreover, since the second surface is a large face, it facilitates arrangement of a longer second restraint protrusion along a width direction of the first end plate to improve reliability of restraint of the battery module in the box body in the height direction.

Optionally, the mounting plate is further provided with a second restraint face, and the second restraint face is configured to abut the first end plate to limit the first end plate to move downward.

In the foregoing technical solution, after the battery module is mounted in the box body, possibility of excessive pressure adhesive for the battery module could be reduced, which is benefit for ensuring that the thickness of an adhesive layer meets the requirements, thereby ensuring a bonding effect between a lower end of the battery module and the first wall.

Optionally, an upper surface of the mounting plate is the second restraint face, and the existing upper surface of the second wall is used as a restraint face, which is benefit for simplifying the structure of the second wall.

Optionally, the first end plate is provided with a second restraint protrusion, and a lower surface of the second restraint protrusion is configured to abut the second restraint face to limit the first end plate to move downward.

In the foregoing technical solution, the manner in which the second restraint protrusion abuts the second restraint face for restraint has the advantages of simple structure, convenient mounting of the battery module in the box body, and the like, while realizing that the first end plate and the box body are reliably restrained.

Optionally, a lower end of the battery cell arrangement structure is attached to the first wall, and a gap is provided between a lower end of the first end plate and the first wall to reduce a height of the first end plate.

In a second aspect, an embodiment of the present application provides a power consumption apparatus, and the power consumption apparatus includes the battery provided in the first aspect of the embodiment of the present application.

In a third aspect, an embodiment of the present application provides a method for producing a battery. The method includes: providing a box body; providing a mounting plate; providing a battery module, the battery module including a battery cell arrangement structure and a first end plate, the battery cell arrangement structure including a plurality of battery cells stacked on each other, the first end plate being disposed on one side of the battery cell arrangement structure and fixedly connected to the battery cell arrangement structure, the first end plate having a first elastic support part, and the first elastic support part being configured to be capable of abutting the mounting plate, being squeezed by the battery cell arrangement structure and deforming when the battery cell arrangement structure expands to provide expansion space for the battery cell arrangement structure; fixedly connecting the mounting plate to the box body; and mounting the battery module in the box body, and allowing the first end plate to be located between the mounting plate and the battery cell arrangement structure.

Optionally, the battery module further includes a second end plate, the second end plate is disposed on one side of the battery cell arrangement structure far away from the first end plate, and the second end plate is fixedly connected to the battery cell arrangement structure; and the mounting the battery module in the box body includes: placing the battery module in the box body, and fixedly connecting the second end plate to the box body.

Optionally, the mounting plate is provided with a first restraint face, and the first restraint face is configured to abut the first end plate to limit the first end plate to move upward; and the mounting the battery module in the box body includes: applying a squeezing force to the battery module to compress a length of the battery module; placing the battery module in a compressed state in the box body; and removing the squeezing force to restore the length of the battery module, so as to move at least a portion of the first end plate to a bottom of the first restraint face.

BRIEF DESCRIPTION OF DRAWINGS

In order to illustrate technical solutions in embodiments of the present application more clearly, brief description will be made below to accompanying drawings required in the embodiments. It should be understood that the following accompanying drawings illustrate some embodiments of the present application only, and thus should not be considered as limiting the scope. Other related drawings could be obtained based on these accompanying drawings by those ordinary skilled in this art without creative efforts.

DESCRIPTION OF EMBODIMENTS

Figure 1:
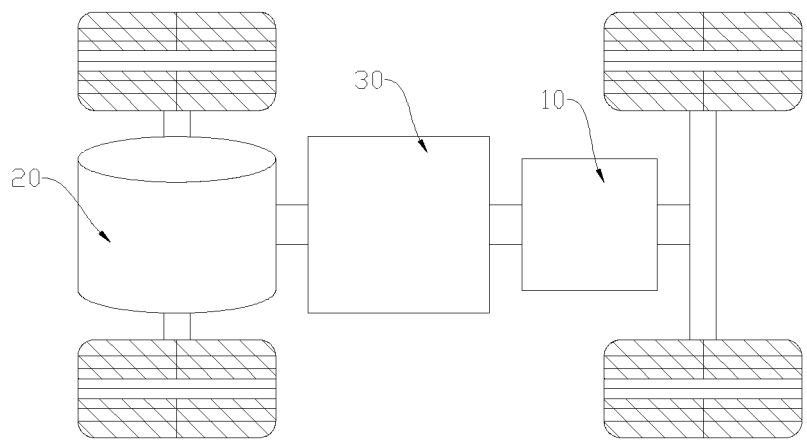
FIG. 1 is a schematic diagram of a vehicle provided in an embodiment of the present application.

To make the objectives, technical solutions and advantages of the embodiments of the present application clearer, the technical solutions in the embodiments of the present application will be described clearly and completely below with reference to the accompanying drawings in the embodiments of the present application. Apparently, the described embodiments are merely some but not all of the embodiments of the present application. The components of the embodiments of the present application generally described and shown in the drawings herein may be arranged and designed in various configurations.

Therefore, the following detailed description of the embodiments of the present application provided in the accompanying drawings is not intended to limit the scope of the claimed application, but merely represents selected embodiments of the present application. All the other embodiments obtained by those of ordinary skill in the art based on the embodiments of the present application without any inventive effort shall fall within the scope of protection of the present application.

It should be noted that, the embodiments in the present application and features in the embodiments may be mutually combined in case of no conflict. It should be noted that similar reference numerals and letters indicate similar items in the following drawings. Therefore, once a certain item is defined in one drawing, it is unnecessary to further define and explain it in the subsequent drawings.

In the description of the embodiments of the present application, it should be noted that, the terms such as "up", "down", "inside", and "outside" indicate that orientations or positional relationships are orientations or positional relationships shown based on the accompanying drawings, or orientations or positional relationships of products of the present application when they are used, or orientations or positional relationships commonly appreciated by those skilled in the art, or orientations, and they are merely for convenience of describing the present application and for simplifying the description, rather than for indicating or implying that an indicated apparatus or element must have a specific orientation, and must be constructed and operated in a specific orientation, which thus shall not be understood as limitation to the present application. In addition, the terms such as "first", "second", and "third" are merely intended for distinguishing the description, and shall not be understood as an indication or implication of relative importance.

In the description of the present application, it should be further noted that, unless explicitly specified and defined otherwise, if the terms "disposing", "mounting", "connecting", and "connection" occur, they should be understood in a broad sense, for example, they may be a fixed connection, a detachable connection, or an integrated connection; they may be a mechanical connection, or an electrical connection; and they may be a direct connection, or an indirect connection via an intermediary, or communication between interiors of two elements. Those of ordinary skill in the art may appreciate the specific meanings of the foregoing terms in the present application according to specific conditions.

Application of a battery generally includes three levels: a battery cell, a battery module, and a battery pack. The battery cell includes a positive electrode sheet, a negative electrode sheet, an electrolytic solution and a separator. The separator is disposed between the positive electrode sheet and the negative electrode sheet to prevent internal short circuits. A common battery cell may be generally divided into three types according to the way of packaging: a cylindrical battery cell, a prismatic battery cell and a pouch battery cell.

The battery module refers to a single physical module including a plurality of battery cells to provide a higher voltage and/or capacity. In the battery module, the plurality of battery cells may be connected in series and/or in parallel via busbars for various applications, for example, high-power applications such as some electric vehicles.

The battery pack is constructed by assembling components such as a battery management system on the basis of one or more battery modules, and then putting them in a sealed box body, and the box body is then connected to a power consumption apparatus such as an electric vehicle. The battery mentioned in the embodiments of the present application may be a battery pack.

During the production of the box body of the battery, it is more and more popular to adopt a die-casting process for molding. The die-casting process for molding has the advantages of high production efficiency and simple processes. However, a side wall of the box body for which the die-casting process for molding is adopted has a draft angle, resulting in that it is difficult to construct a restraint structure between the battery module and an inner wall of the box body by themselves, and it is difficult to realize stable mounting of the battery module in the box body without the help of a fastener. The use of a fastener to connect the two results in that it is difficult to provide suitable expansion space for the battery module in the battery. Since the battery module and the box body are rigidly connected using a bolt, during the expansion the battery module, although part of an expansion force could be released to a certain extent through partial deformation of an end plate of the battery module, a rigid connection is formed between the end plate and the box body due to the use of locking with a bolt between the two. Therefore, the box body is certainly affected during the deformation of the end plate, which may cause the deformation of the box body. If it is desirable to avoid the deformation of the box body due to the deformation of the end plate, an amount of partial deformation of the end plate is small, which is not benefit for providing sufficient expansion space for the battery module. The battery cell is still squeezed by the inner wall of the box body during the expansion, and a phenomenon of lithium plating may occur, resulting in a dive of battery capacity.

In view of this, a battery 10 is provided in some embodiments of the present application. In the battery 10, expansion space could be provided for a battery module 200, and an expansion force could be released, which is benefit for reducing possibility of occurrence of lithium plating due to squeeze of battery cells 211, and could reduce possibility of deformation of a box body 100 at the same time. In other words, the possibility of deformation of the box body 100 may be reduced while the expansion space is provided for the battery module 200.

An embodiment of the present application provides a power consumption apparatus that uses the battery 10 as a power source. The power consumption apparatus may be, but is not limited to, a vehicle 1, a ship or an aerial vehicle.

It can be understood that the battery 10 described in the embodiments of the present application is applicable to various apparatuses using batteries, such as mobile phones, notebook computers, electromobiles, electric automobiles, ships, spacecrafts, electric toys and electric tools. For example, the spacecrafts include rockets, space shuttles, spaceships, and the like. The electric toys include fixed or mobile electric toys, such as game consoles, electric vehicle toys, electric ship toys and electric airplane toys. The electric tools include electric metal cutting tools, electric grinding tools, electric assembling tools and electric railway tools, such as electric drills, electric grinders, electric spanners, electric screwdrivers, electric hammers, concrete vibrators, and electric planers.

The battery described in the embodiments of the present application is not only applicable to the power consumption apparatus described above, but also applicable to all apparatuses using the battery 10.

As shown in FIG. 1, FIG. 1 is a schematic structural diagram of a vehicle 1 according to an embodiment of the present application. The vehicle 1 may be a fuel-powered vehicle, a gas-powered vehicle or a new energy vehicle, and the new energy vehicle may be a battery electric vehicle, a hybrid vehicle, an extended-range vehicle, or the like. A battery 10, a motor 20 and a controller 30 may be disposed inside the vehicle 1, and the controller 30 is configured to control the battery 10 to supply power to the motor 20. For example, the battery 10 is disposed at the bottom or head of the vehicle 1. The battery 10 may be used for power supply to the vehicle 1. For example, the battery 10 may serve as an operation power source of the vehicle 1 for a circuit system of the vehicle 1, for example, for a working power demand of the vehicle 1 during startup, navigation and running.

In another embodiment of the present application, the battery 10 may be used not only as an operation power source of the vehicle 1, but also as a driving power source of the vehicle 1, replacing or partially replacing fuel or natural gas to provide driving power for the vehicle 1.

During the production of a box body of the battery, it is more and more popular to adopt a die-casting process for molding. The die-casting process for molding has the advantages of high production efficiency and simple processes. However, a side wall of the box body for which the die-casting process for molding is adopted has a draft angle, resulting in that it is difficult to construct a restraint structure between a battery module and an inner wall of the box body by themselves, and it is difficult to realize stable mounting of the battery module in the box body without the help of a fastener. The use of a fastener to connect the two results in that it is difficult to provide suitable expansion space for the battery module in the battery.

Figure 2:
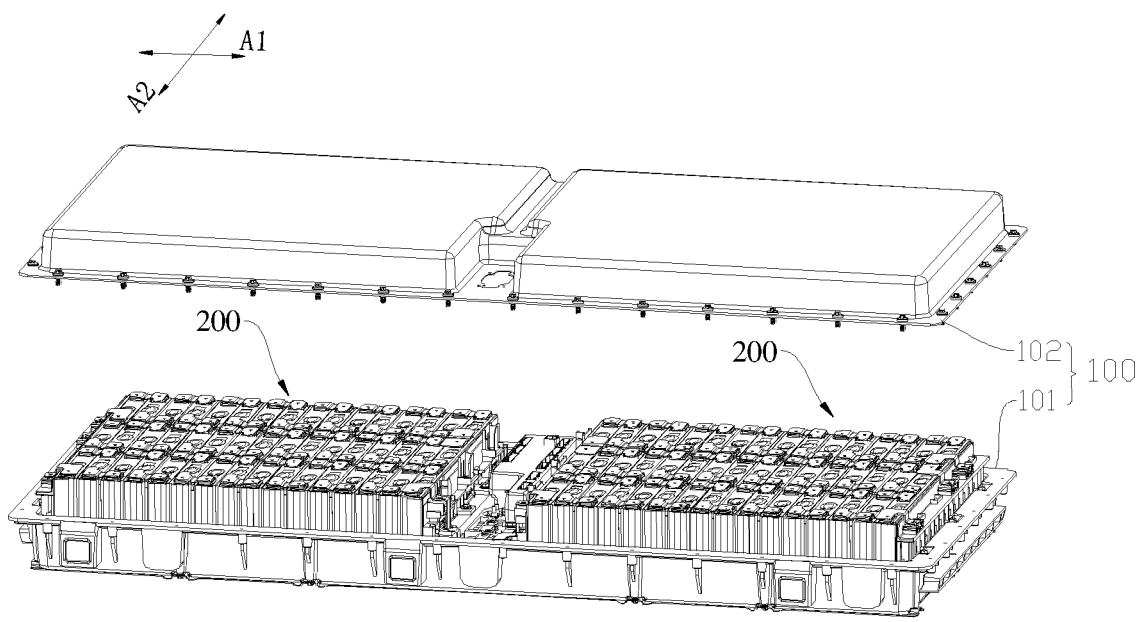
FIG. 2 is a schematic exploded view of a battery provided in an embodiment of the present application.
Figure 3:
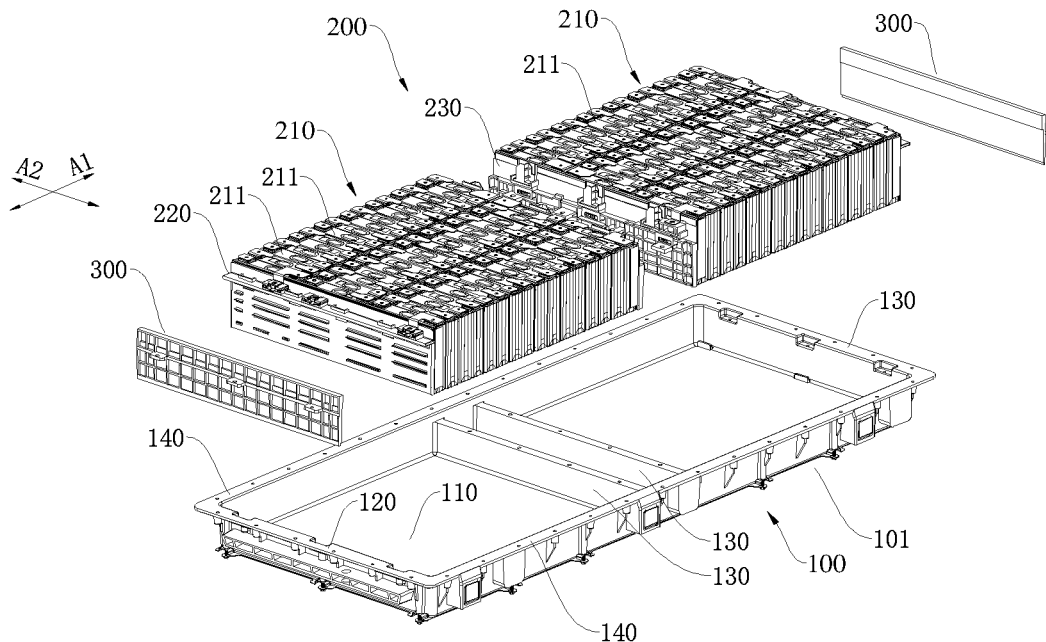
FIG. 3 is a schematic exploded view of a battery provided in an embodiment of the present application, where an upper cover body is not shown.

In some embodiments of the present application, the vehicle may be powered by a battery 10 as shown in FIG. 2 and FIG. 3. The battery 10 includes a battery module 200, a mounting plate 300 and a box body 100, and the battery module 200 and the mounting plate 300 are disposed in the box body 100. The battery module 200 includes a battery cell arrangement structure 210 and a first end plate 220, the battery cell arrangement structure 210 may include a plurality of battery cells 211 stacked along a first direction A1, the first end plate 220 is disposed between the box body 100 and the battery cell arrangement structure 210, and the first end plate 220 is fixedly connected to the battery cell arrangement structure 210. The mounting plate 300 is disposed between the first end plate 220 and the box body 100, and the mounting plate 300 is fixedly connected to the box body 100.

Figure 4:
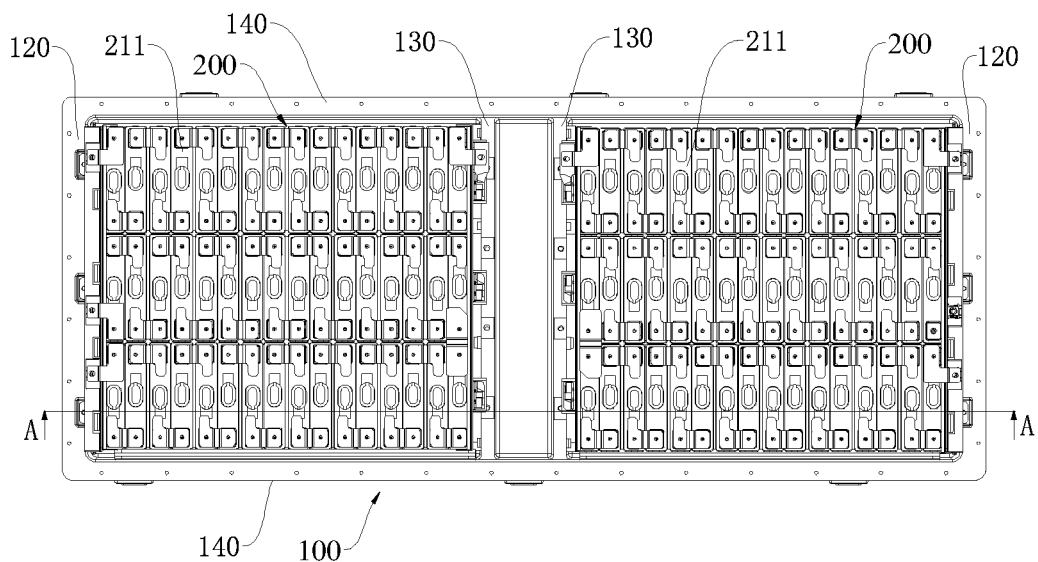
FIG. 4 is a schematic top view of a battery provided in an embodiment of the present application.
Figure 5:
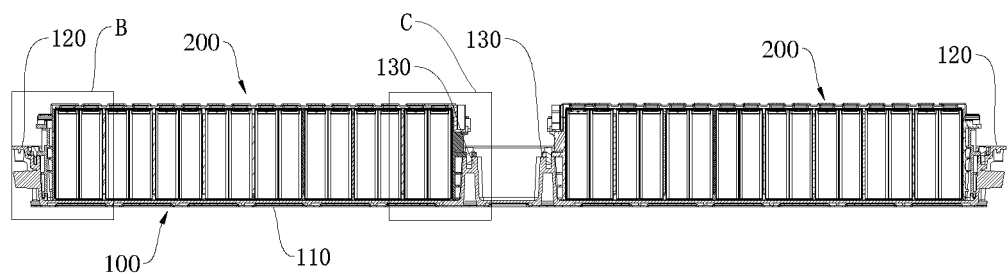
FIG. 5 is a schematic sectional view taken along a line A-A in FIG. 4.
Figure 6:
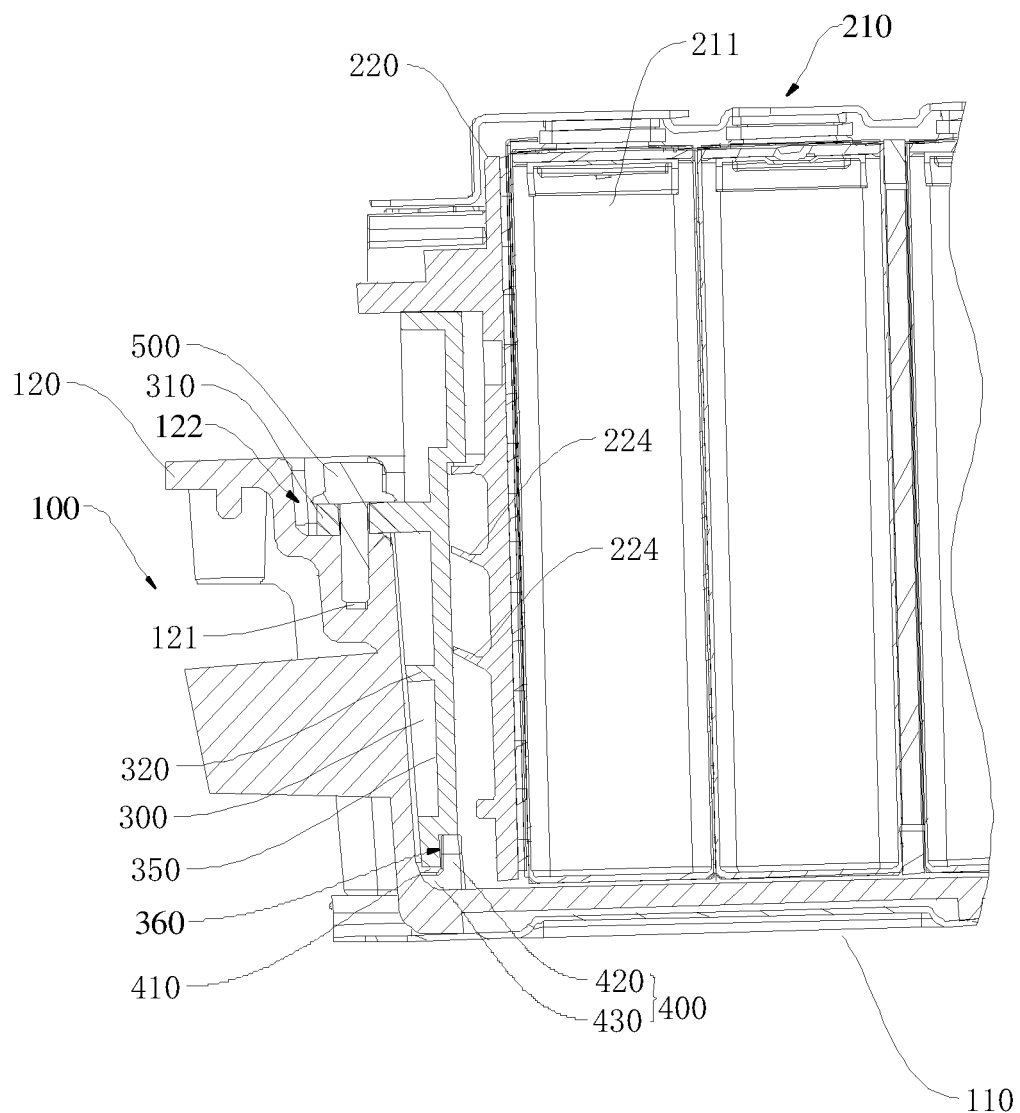
FIG. 6 is an enlarged schematic diagram of a part B of FIG. 5.

As shown in FIG. 4 to FIG. 6, the first end plate 220 includes a first elastic support part 224, the first elastic support part 224 is configured to be capable of abutting the mounting plate 300, being squeezed by the battery cell arrangement structure 210 and deforming when the battery cell arrangement structure 210 expands to provide expansion space for the battery cell arrangement structure 210.

In the foregoing technical solution, since the battery cell arrangement structure 210 includes the plurality of battery cells 211 in the first direction A1, the battery module 200 expands mainly along the first direction A1 when expanding. The first elastic support part 224 provides the expansion space through its own deformation, and the deformation is reliable, which could provide the expansion space for the battery cell arrangement structure 210 in time (that is, the expansion space is provided for the battery module 200), mainly the expansion space in the first direction A1, to release an expansion force of the battery cell arrangement structure 210, could reduce the possibility of deformation of the box body 100 caused by the expansion force, and improves reliability of assembly and the service life of the box body 100. Meanwhile, by releasing the expansion force, the possibility of occurrence of lithium plating in the battery cells 211 caused by an excessive squeezing force between the mounting plate 300 and the first end plate 220 could be reduced. Therefore, the possibility of deformation of the box body 100 may be reduced while the expansion space is provided for the battery module 200, which is beneficial to normal operation of the battery 10.

In addition, due to the provision of the mounting plate 300, it is benefit for adding a molding manner of the box body 100. For example, by providing the mounting plate 300, the box body 100 may be molded by means of a die-casting process. By reasonably designing a structure of the mounting plate 300 and arranging its position on the box body 100, it is benefit for offsetting a draft angle of the box body 100 to facilitate construction of a restraint structure between the battery module 200 and the box body 100, so as to realize restraint of the battery module 200 in the box body 100.

The fixed connection between the first end plate 220 and the battery cell arrangement structure 210 can be realized in any suitable manner, for example, bonding, or connecting with a cable tie, or connecting the first end plate 220 and the battery cell arrangement structure 210 using an end side plate, which is not limited in the embodiments of the present application.

The fixed connection between the mounting plate 300 and the box body 100 may mean that the two are connected through a fastener, or the two are welded, or the like, which is also not limited in the embodiments of the present application.

In an embodiment of the present application, as shown in FIG. 2 and FIG. 3, the box body 100 may include a lower box body 101 and an upper cover body 102, the upper cover body 102 hermetically covers the lower box body 101, and the battery module 200 may be mounted to the lower box body 101.

As shown in FIG. 3 and FIG. 6, in an embodiment of the present application, the box body 100 includes a first wall 110 and a second wall 120, the second wall 120 is connected to the first wall 110 and extends upward, the battery module 200 is located above the first wall 110, that is, the first wall 110 is a bottom wall of the box body 100, the second wall 120 is a side wall connected to the bottom wall, and the mounting plate 300 is disposed between the first end plate 220 and the second wall 120. The first wall 110 may be a bottom wall of the lower box body 101, and the second wall 120 may be a side wall of the lower box body 101. For this reason, the expansion space is provided between the first end plate 220 and the mounting plate 300 for the battery cell arrangement structure 210 through the deformation of the first elastic support part 224, which could reduce a squeezing force of the battery module 200 to the second wall 120 of the box body 100.

As shown in FIG. 6, in an embodiment of the present application, the mounting plate 300 may be connected to the second wall 120 through a first fastener 500 to fix the mounting plate 300 to the box body 100.

To ensure reliability of the connection between the mounting plate 300 and the second wall 120, as shown in FIG. 6, in an embodiment of the present application, a restraint groove 410 with an opening facing upward is disposed in the box body 100, and a lower end of the mounting plate 300 is plugged into the restraint groove 410. For this reason, the lower end of the mounting plate 300 is restrained in the box body 100, which improves reliability of the connection between the mounting plate and the box body 100.

The restraint groove 410 may be formed in any suitable structure. For example, a restraint member 400 is fixed in the box body 100, and the above restraint groove 410 is provided on the restraint member itself, or the restraint groove 410 is restricted by the restraint member 400 and an inner wall of the box body 100, or the restraint groove 410 is provided on an inner wall of the box body 100. For example, the restraint groove 410 is provided on the first wall 110.

Optionally, as shown in FIG. 6, in an embodiment of the present application, a restraint member 400 is disposed in the box body 100, the restraint member 400 has an upright part 420, and the restraint groove 410 is restricted between the upright part 420 and the second wall 120.

Optionally, as shown in FIG. 6, the restraint member 400 may be an L-shaped plate, the L-shaped plate includes an upright part 420 and a horizontal part 430 connected to each other, a bottom face of the horizontal part 430 is connected to the first wall 110, and one end of the horizontal part 430 far away from the upright part 420 is connected to the second wall 120. The structure of the L-shaped plate is simple, and the L-shaped plate is connected to the first wall 110 through the horizontal part 430, which increases the connection area between the restraint member 400 and the inner wall of the box body 100, thereby increasing reliability of the connection between the two, and further being benefit for ensuring reliability of restraint of the restraint member 400 on the lower end of the mounting plate 300.

The bottom face of the horizontal part 430 may be welded to the first wall 110, and one end of the horizontal part 430 far away from the upright part 420 may be welded to the second wall 120.

Figure 7:
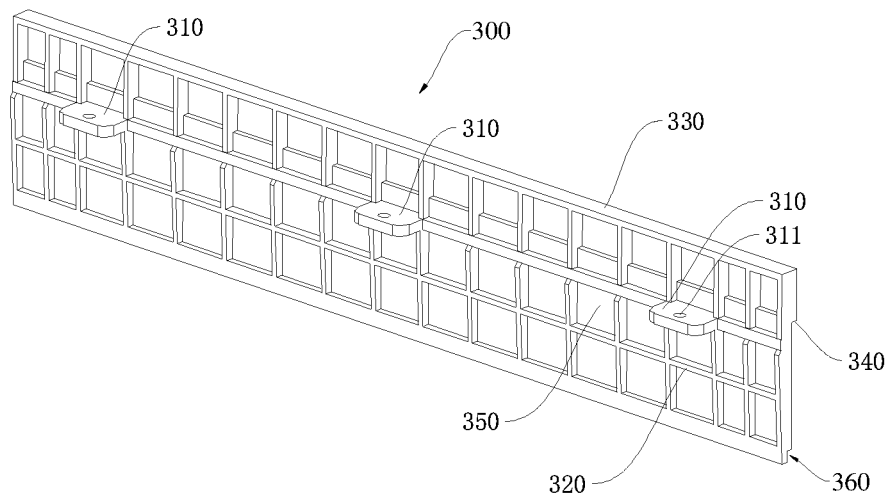
FIG. 7 is a schematic diagram of a three-dimensional structure of a mounting plate provided in an embodiment of the present application.

As shown in FIG. 6 and FIG. 7, in an embodiment of the present application, the lower end of the mounting plate 300 is bent toward the second wall 120 to construct a restraint step 360, the upright part 420 of the restraint member 400 abuts on a step face of the restraint step 360, and an upright section of the restraint step 360 is inserted into the restraint groove 410. This arrangement is benefit for avoiding the upright part 420 of the restraint member 400 to protrude from a face of the mounting plate 300 close to the first end plate 220 toward the first end plate 220. Therefore, during the expansion of the battery module 200, possibility of restraining movement of the first end plate 220 toward the mounting plate 300 due to the protrusion of the upright part 420 could be reduced while possibility of applying a squeezing force to part of the first end plate 220 due to the protrusion of the upright part 420 is reduced, thereby being benefit for improving consistency of forces that the battery cells 211 are subjected to.

The specific structure of the mounting plate 300 is not limited in the embodiments of the present application. As shown in FIG. 6, optionally, in an embodiment of the present application, the mounting plate 300 includes a mounting plate body 350 and a first extending part 310, the first extending part 310 extends from the mounting plate body 350 toward the second wall 120, and the first extending part 310 is fixedly connected to the second wall 120. By providing the first extending part 310, it facilitates the connection between the mounting plate 300 and the second wall 120. In addition, due to the provision of the first extending part 310, the mounting plate body 350 could be connected to the second wall 120 through the first extending part 310 when arranged in an upright direction. In this way, a draft angle of the second wall 120 could be offset, and the connection between the mounting plate 300 and the box body 100 is conveniently realized.

As shown in FIG. 6, the first extending part 310 may be fixedly connected to an upper surface of the second wall 120. The first extending part 310 is connected to the upper surface of the second wall 120 to facilitate operation and be benefit for simplifying the connection structure therebetween. For example, as shown in FIGS. 6 and 7, the upper surface of the second wall 120 is provided with a mounting bolt hole 121, the first extending part 310 is provided with a mounting through hole 311, and a lower end of the first fastener 500 passes through the mounting through hole 311 to be fixed in the mounting bolt hole 121.

In other embodiments of the present application, a groove into which the first extending part 310 is inserted may be provided in the middle of the second wall 120 in the height direction, and the first extending part 310 is fixed into the groove with the help of a fastener.

As shown in FIG. 6 and FIG. 7, in an embodiment of the present application, the first extending part 310 may be multiple in quantity, the multiple first extending parts 310 are arranged at intervals along a length direction of the mounting plate 310 (a direction perpendicular to the first direction A1), a plurality of recessed parts 122 are provided at corresponding positions on the upper surface of the second wall 120, and the first extending parts 310 are plugged into the recessed parts 122. Mounting bolt holes 121 are formed on bottom walls of the recessed parts 122. The multiple first extending parts 310 are benefit for improving the reliability of the connection between the mounting plate 300 and the second wall 120. Moreover, the first extending parts 310 are plugged into the recessed parts 122, which is also benefit for further improving the reliability of the connection between the mounting plate 300 and the second wall 120.

As shown in FIG. 6 and FIG. 7, in an embodiment of the present application, the mounting plate 300 further includes a second extending part 320, the second extending part 320 extends from the mounting plate body 350 toward the second wall 120 and abuts the second wall 120, and the second extending part 320 and the first extending part 310 are spaced apart in an up-down direction. By providing the second extending part 320, connection points between the mounting plate 300 and the second wall 120 in the up-down direction are increased, and the reliability of the connection between the mounting plate 300 and the second wall 120 is improved.

Optionally, one end of the second extending part 320 for abutting the second wall 120 may be provided with an inclined face to facilitate face-to-face contact with the second wall 120.

The first extending part 310 may be located either above the second extending part 320 or below the second extending part 320, which is not limited in the embodiments of the present application. Optionally, in the embodiment shown in FIG. 6, the first extending part 310 is located above the second extending part 320, and the second extending part 320 is substantially connected to the middle position of the second wall 120 in the height direction.

In an embedment of the present application, rigidity of the mounting plate 300 may be greater than rigidity of the first end plate 220, so that when the battery cell arrangement structure 210 expands, the first end plate 220 easily deforms to provide expansion space for the battery module 200. Meanwhile, the rigidity of the mounting plate 300 meets the requirements, which plays a role in reliably mounting the battery module 200 in the box body 100.

The specific materials of the mounting plate 300 and the first end plate 200 are not limited in the embodiments of the present application. Optionally, in an embodiment of the present application, the mounting plate 300 may be made of a metal material, for example, an aluminum alloy material. The first end plate 220 is made of a non-metal material, for example, a plastic material.

In an embodiment of the present application, a height of the mounting plate 300 is not smaller than a height of the battery cell arrangement structure 210, and the height of the mounting plate 300 is greater than a height of the second wall 120.

In this embodiment, even if the height of the second wall is relatively small (the height is smaller than the height of the battery cell arrangement structure 210), when the battery cell arrangement structure 210 expands, the mounting pate 300 can abut the first end plate 220 in the up-down direction, which does not cause the position of the first end plate 220 corresponding to the height of the upper surface of the second wall 120 to be subjected to a shear force, and thus the case of damage to the battery cells 211 caused by reduction of the height of the second wall 120 does not occur.

Figure 8:
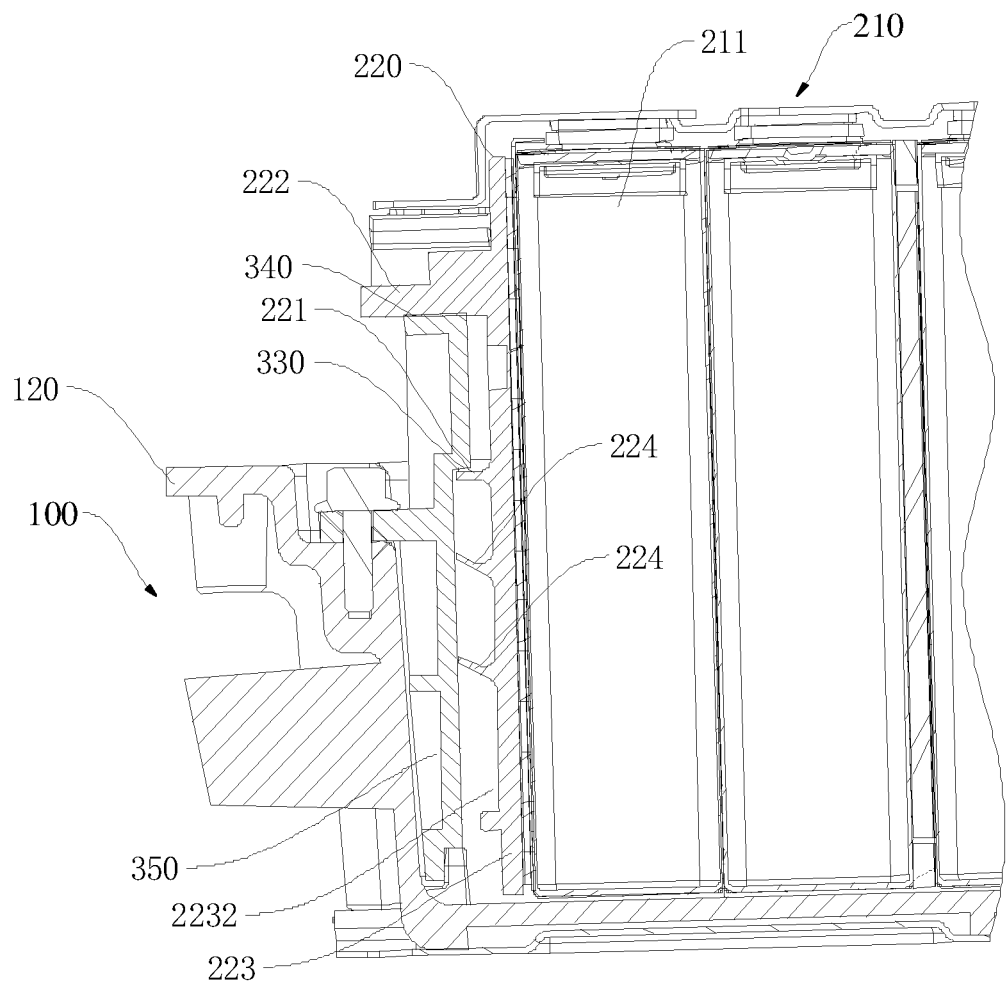
FIG. 8 is an enlarged schematic diagram of a part B of FIG. 5, where reference numerals of a first restraint face and a second restraint face are shown.

To deform the first elastic support part 224 easily when squeezed, as shown in FIG. 8, in an embodiment of the present application, at least a portion of the first elastic support part 224 obliquely extends upward toward the mounting plate 300. For this reason, when the first end plate 220 is squeezed, since the first elastic support part 224 has an inclined angle, the first elastic support part 224 deforms more easily when squeezed by the mounting plate 300, which could provide the expansion space for the battery cell arrangement structure 210 in time.

It should be noted that the angle at which the first elastic support part 224 inclines upward may be any angle, as long as the deformation requirement can be met, and the angle at which the first elastic support part 224 inclines upward is not limited in the embodiments of the present application.

Figure 9:
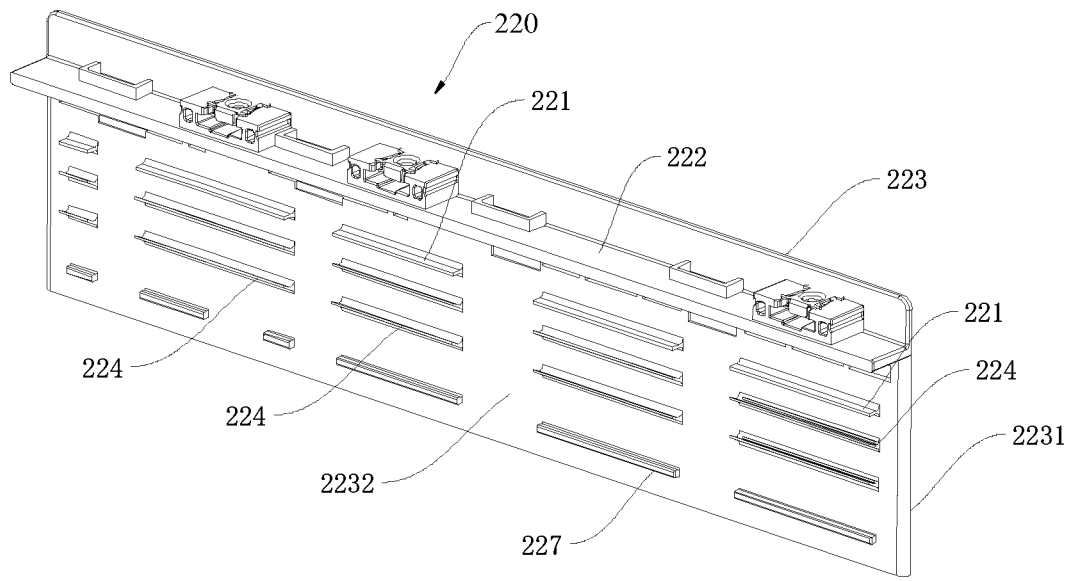
FIG. 9 is a schematic diagram of a three-dimensional structure of a first end plate provided in an embodiment of the present application.

As shown in FIG. 8 and FIG. 9, in an embodiment of the present application, the first end plate 220 further includes an end plate body 223, the end plate body 223 has a first surface 2231 facing the battery cell arrangement structure 210 and a second surface 2232 facing away from the battery cell arrangement structure 210, and the first elastic support part 224 is disposed on the second surface 2232. The second surface 2232 is a large face (a face with a large area) of the end plate body 223, which facilitates the provision of the first elastic support part 224. In addition, since the second surface 2232 is a large face, it facilitates arrangement of more first elastic support parts 224, which is benefit for dispersing the expansion force of the battery cell arrangement structure 210, and reduces a phenomenon of occurrence of lithium plating due to squeeze of the battery cells 211 caused by concentration of the squeezing force.

It can be understood that, in other embodiments of the present application, the first elastic support parts 244 may be disposed on two side walls of the end plate body 233 in a thickness direction (the first direction A1), that is, on small faces (faces with a small area) of the end plate body 223, and extend toward the mounting plate 300.

To disperse the expansion force of the battery cell arrangement structure 210 as much as possible, in an embodiment of the present application, an orthographic projection of the first elastic support part 224 on a horizontal plane is in a long strip shape, a face on which one long side of the long strip shape is located is connected to the second surface 2232, and a face on which the other long side of the long strip shape is located abuts the mounting plate 300. In other words, the first elastic support part 224 is arranged on the second surface 2232 along a length direction of the first end plate 220 (a direction perpendicular to the first direction A1), which is benefit for dispersing the expansion force of the battery cell arrangement structure 210 in the length direction of the first end plate 220.

To deform the first elastic support part 224 easily, as shown in FIG. 8, optionally, the first elastic support part 224 may be shaped in a thin sheet. That is, in this embodiment, the first elastic support part 224 is constructed as a thin sheet-shaped structure obliquely extending upward.

It should be noted that the specific structure of the first elastic support part 224 is not limited in the embodiments of the present application. For example, the first elastic support part 224 may be constructed as a horizontal protrusion extending along the first direction A1, and the first elastic support part 224 is provided with a strength weakening structure such as a groove to weaken the strength of the first elastic support part 224, so that the first elastic support part 224 deforms easily when squeezed by the second wall 120. In addition, the first elastic support part 224 may be a spring, one end of the spring is connected (for example, welded) to the second surface 2232, and the other end extends toward the mounting plate 300.

As shown in FIG. 8 and FIG. 9, in an embodiment of the present application, the first elastic support part 224 is multiple in quantity, and the multiple first elastic support parts 224 are arranged at intervals on the second surface 2232 along an up-down direction, which is benefit for evenly dispersing the expansion force, improves consistency of forces that positions on a face where the battery cell arrangement structure 210 is in contact with the first end plate 220 are subjected to, improves consistency of forces that the battery cells 211 are subjected to, and reduces the problem caused by inconsistent forces that the battery cells 211 are subjected to.

Further, as shown in FIG. 9, the multiple first elastic support parts 224 may be arranged in a rectangular array on the second surface 2232 to be benefit for evenly dispersing the expansion force of the entire battery arrangement structure 210 transferred to the first end plate 220 and to further improve consistency of forces that positions on the battery cell arrangement structure 210 are subjected to, which improves consistency of forces that the battery cells 211 are subjected to.

In a battery of the prior art, to mount a battery module in a box body and restrain the battery module to freely move upward in the box body, an end plate of the battery module is usually mounted to a side wall of the box body through a fastener (for example, a locking bolt). To facilitate the mounting of the fastener, a thickness size of the side wall of the box body is relatively great. Therefore, it is not benefit for increasing the space of the box body for accommodating the battery module, and utilization of space in the box body is reduced.

As shown in FIG. 8, in an embodiment of the present application, the mounting plate 300 is provided with a first restraint face 330, and the first restraint face 330 is configured to abut the first end plate 220 to limit the first end plate 220 to move upward. The first restraint face 330 limits the first end plate 220 to freely move upward, which ensures mounting positions of the first end plate 220 and the battery module 200 in the up-down direction (that is, a height direction of the first end plate 220), and avoids affecting normal operation of the battery module 200 due to the upward movement of the battery module 200. For this reason, it is possible to omit locking with a bolt between the first end plate 220 and the mounting plate 300, which is benefit for reducing the use of parts, and improves utilization of space inside the box body 100. Moreover, since locking with a bolt is cancelled, the rigid connection between the first end plate 220 and the mounting plate 300 is released, so that the possibility of deformation of the box body 100 may be reduced while the battery 10 provides the expansion space for the battery module 200.

The first restraint face 330 may be constructed in any suitable structure. As shown in FIG. 8, in an embodiment of the present application, a surface of the second wall 120 facing the first end plate 220 is partially recessed to form a groove, and an upper side wall of the groove is a the first restraint face 330. The manner of constructing the first restraint face 330 through the upper side wall of the groove is beneficial to weight reduction of the box body 100 while the space of the box body 100 for accommodating the battery module 200 is not occupied.

As shown in FIG. 8, in an embodiment of the present application, the first end plate 220 is provided with a first restraint protrusion 221, and an upper surface of the first restraint protrusion 221 is configured to abut the first restraint face 330 to limit the first end plate 220 to move upward. The manner in which the first restraint protrusion 221 abuts the first restraint face 330 for restraint realizes that the first end plate 220 and the mounting plate 300 are reliably restrained, and compared with the manner of locking with a bolt, it further has the advantages of simple structure, convenient mounting of the battery module 200 in the box body 100, and the like.

To ensure the restraint effect of the first restraint protrusion 221, as shown in FIG. 8, in an embodiment of the present application, the first restraint protrusion 221 horizontally extends toward the mounting plate 300. For this reason, when the battery module 200 expands, the direction in which the first restraint protrusion 221 may move (upward) is perpendicular to the extending direction, so that it is not easy to slide between the first restraint protrusion 221 and the first restraint face 330, which could improve reliability of restraint of the first restraint protrusion 221 and the first restraint face 330.

Further, as shown in FIG. 8, the first restraint face 330 may be a face parallel to a horizontal plane. In this way, when the first restraint protrusion 221 extending toward the second wall 120 along the horizontal direction abuts the first restraint face 330, the two faces are fully attached, which further improves the reliability of restraint of the first restraint protrusion 221 and the first restraint face 330.

When the battery 10 is assembled, first, a squeezing force may be applied to the battery module 200 to compress the length of the battery module 200 in the first direction A1; then, the battery module 200 in a compressed state is placed in the box body 100 and on the first wall 110; and later, the squeezing force is removed to restore the length of the battery module 200, so as to move the first restraint protrusion 221 of the first end plate 220 to a bottom of the first restraint face 330.

To smoothly move the first restraint protrusion 221 to the bottom of the first restraint face 330 after removing the squeezing force, as shown in FIG. 8, in an embodiment of the present application, after the battery module 200 is mounted in the box body 100 in place, a gap is provided between an upper surface of the first restraint protrusion 221 and the first restraint face 330 in the up-down direction when the battery cell arrangement structure 210 does not expand. For this reason, after removing the squeezing force squeezing the first end plate 220, since there is a gap in the up-down direction, the first restraint face 330 does not interfere with the horizontal movement of the first restraint protrusion 221, which is benefit for smoothly moving the first restraint protrusion 221 to a bottom of the first restraint face 330.

As shown in FIG. 8, optionally, after the battery module 200 is mounted in the box body 100 in place, a gap is provided between the first restraint protrusion 221 and the mounting plate 300 in the horizontal direction when the battery cell arrangement structure 210 does not expand, so that the first end plate 220 could move toward the mounting plate, thereby providing the expansion space for the battery cell arrangement structure 210.

In this way, during the expansion of the battery cell arrangement structure 210, the horizontal movement of the first restraint protrusion 221 is divided into two stages. At the first stage, the first restraint protrusion 221 horizontally moves toward the mounting plate 300 until it abuts the mounting plate 300. If the battery cell arrangement structure 210 still expands after the first restraint protrusion 221 abuts the mounting plate 300, the end plate body 223 of the first end plate 220 may partially deform to provide the expansion space continuously.

In an embodiment of the present application, the battery module 200 is bonded to the first wall 110 through a bonding adhesive. In the existing battery 10, the case of pressure adhesive occurs in the battery module 200, that is, after the battery module 200 is mounted in the box body 100, since the battery module 200 excessively squeezes the bonding adhesive on it and the first wall 110, a thickness of an adhesive layer between a lower end of the battery module 200 and the first wall 110 is relatively small, which is not beneficial to the connection between the lower end of the battery module 200 and the first wall 110.

In view of this, as shown in FIG. 8, in an embodiment of the present application, the second wall 120 is further provided with a second restraint face 340, and the second restraint face 340 is configured to abut the first end plate 220 to limit the first end plate 220 to move downward. For this reason, after the battery module 200 is mounted in the box body 100, possibility of excessive pressure adhesive for the battery module 200 could be reduced, which is benefit for ensuring that the thickness of the adhesive layer meets the requirements, thereby ensuring a bonding effect between the lower end of the battery module 200 and the first wall 100.

The second restraint face 340 may be constructed in any suitable structure. As shown in FIG. 8 and FIG. 9, in an embodiment of the present application, the upper surface of the second wall 120 is the second restraint face 340, and the existing upper surface of the second wall 120 is used as a restraint face, which is benefit for simplifying the structure of the second wall 120.

In other embodiments of the present application, a surface of the second wall 120 facing the first end plate 220 is partially recessed to form a groove, and a lower side wall of the groove is constructed as the second restraint face 340.

It should be noted that the specific position relationship between the first restraint face 330 and the second restrain face 340 in the up-down direction is not limited in the embodiments of the present application. Optionally, in the embodiment shown in FIG. 8, the second restraint face 340 is an upper surface of the mounting plate body 350, and the second restraint face 340 is located above the first restraint face 330.

As shown in FIG. 8 and FIG. 9, in an embodiment of the present application, the first end plate 220 is further provided with a second restraint protrusion 222, and a lower surface of the second restraint protrusion 222 is configured to abut the second restraint face 340 to limit the first end plate 220 to move downward. The manner in which the second restraint protrusion 222 abuts the second restraint face 340 for restraint has the advantages of simple structure, convenient mounting of the battery module 200 in the box body 100, and the like, while realizing that the first end plate 220 and the box body 100 are reliably restrained.

To ensure the restraint effect of the second restraint protrusion 222, as shown in FIG. 7, in an embodiment of the present application, the second restraint protrusion 222 extends toward the mounting plate 300 along the horizontal direction.

As shown in FIG. 8 and FIG. 9, the first restraint protrusion 221 is disposed on the second surface 2232 of the end plate body 223. The second surface 2232 is a large face (a face with a large area) of the end plate body 223, which facilitates the provision of the first restraint protrusion 221. Moreover, since the second surface 2232 is a large face, it facilitates arrangement of a longer first restraint protrusion 221 long the length direction of the first end plate 220 (a direction perpendicular to the first direction A1) to improve the reliability of restraint of the battery module 200 in the box body 100 in the up-down direction as much as possible.

It can be understood that, in other embodiments of the present application, the first restraint protrusions 221 may be disposed on two sides of the end plate body 223 in a thickness direction (the first direction A1), that is, on small faces (faces with a small area) of the end plate body 223, and extend toward the mounting plate 300.

In an embodiment of the present application, an orthographic projection of the first restraint protrusion 221 on the horizontal plane is in a long strip shape, and a face on which one long side of the long strip shape is connected to the second surface 2232. The first restraint protrusion 221 is in a long strip shape, which is benefit for increasing the contact area between the first restraint protrusion 221 and the first restraint face 330, thereby being benefit for improving the restraint effect of the first restraint protrusion 221.

Similarly, as shown in FIG. 8 and FIG. 9, the second restraint protrusion 222 may be disposed on the second surface 2232 of the first end plate 220. The second surface 2232 is a large face of the first end plate 220, which facilitates the provision of the second restraint protrusion 222. Moreover, since the second surface 2232 is a large face, it facilitates arrangement of a longer second restraint protrusion 222 along the length direction of the first end plate 220 to improve the reliability of restraint of the battery module 200 in the box body 100 in the height direction.

It can be understood that, in other embodiments of the present application, the second restraint protrusions 222 may be disposed on two sides of the end plate body 233 in a thickness direction, that is, on small faces (faces with a small area) of the end plate body 223, and extend toward the mounting plate 300.

In addition, an orthographic projection of the second restraint protrusion 222 on the horizontal plane may be in a long strip shape, and a face on which one long side of the long strip shape is connected to the second surface 2232. The second restraint protrusion 222 is in a long strip shape, which is benefit for increasing the contact area between the second restraint protrusion 222 and the second restraint face 340, thereby being benefit for improving the restraint effect of the second restraint protrusion 222.

In the embodiments of the present application, the lower end of the battery cell arrangement structure 210 may be attached to the first wall 110, and a gap is provided between the lower end of the first end plate 220 and the first wall 110 to ensure the contact between the battery cell arrangement structure 210 and the first wall 110.

It should be noted that the "attachment" mentioned above may mean that the lower end of the battery cell arrangement structure 210 is in contact with but not connected to the first wall 110, or mean that the lower end of the battery cell arrangement structure 210 is in contact with and connected to the first wall 110. For example, the two are bonded by an adhesive.

Figure 10:
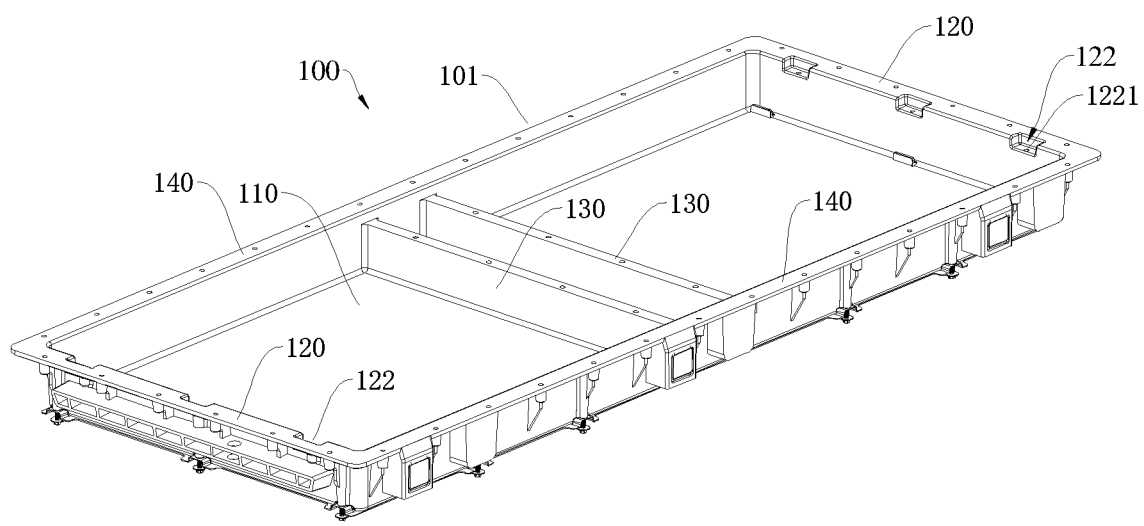
FIG. 10 is a schematic diagram of a three-dimensional structure of a box body of a battery provided in an embodiment of the present application.

As shown in FIG. 3 and FIG. 10, in an embodiment of the present application, the box body 100 may include a third wall 130, the third wall 130 is connected to the first wall 100 and extends upward, the third wall 130 is disposed opposite to the second wall 120 along the first direction A1, and the first elastic support part 224 abuts the mounting plate 300 when the battery cell arrangement structure 210 does not expand to realize locating of the battery module 200 in the first direction A1. For this reason, after the battery module 200 is mounted in the box body 100, the first elastic support part 224 of the first end plate 220 abuts the mounting plate 300, and a second end plate 230 is fixedly connected to the third wall 120, which could provide mounting locating in the first direction A1 for the battery module 200, and ensures the reliability of the mounting of the battery module 200 in the first direction A1.

Here, when the battery cell arrangement structure 210 does not expand, the first elastic support part 224 abuts the mounting plate 300, which may mean that the first elastic support part 224 is exactly in contact with the mounting plate 300 and the first elastic support part 224 is in an unreformed state, or mean that the first elastic support part 224 abuts on the mounting plate 300 and is in a deformed state, which is not limited in the embodiments of the present application.

Optionally, in an embodiment of the present application, the battery module 200 is in an interference fit with the box body 100, and the first elastic support part 224 is configured to absorb a magnitude of interference in the first direction A1 through generation of elastic deformation. That is, in this embodiment, when the battery cell arrangement structure 210 does not expand, the first elastic support part 224 abuts on the mounting plate 300 and is in a deformed stated. In addition to the advantage of providing the mounting locating in the first direction A1 for the battery module 200 mentioned above, this setting has at least the following two advantages: first, after the battery module 200 is assembled in place, the first elastic support part 224 provides an assembly margin in the first direction A1 for the battery module 200, so that a dimension error of the battery module 200 in the first direction A1 can be offset by the deformation of the first elastic support part 224. For example, when a dimension of the battery module 200 in the first direction A1 is greater than a mounting dimension of the box body 100 in the corresponding direction, it can be realized that the battery module 200 is smoothly mounted in the box body 100 through the deformation of the first elastic support part 224. Therefore, requirements on processing and assembly accuracy of the battery module 200 in the first direction A1 are reduced. Second, after the battery module 200 is assembled in place, since the first elastic support part 244 is in a deformed state, a reaction force of the mounting plate 300 could be transferred to the battery cell arrangement structure 210. The battery cells 211 are subjected to a certain pressure, which is benefit for ensuring good contact between interfaces of positive electrode sheets and negative electrode sheets inside the battery cells 211.

Figure 11:
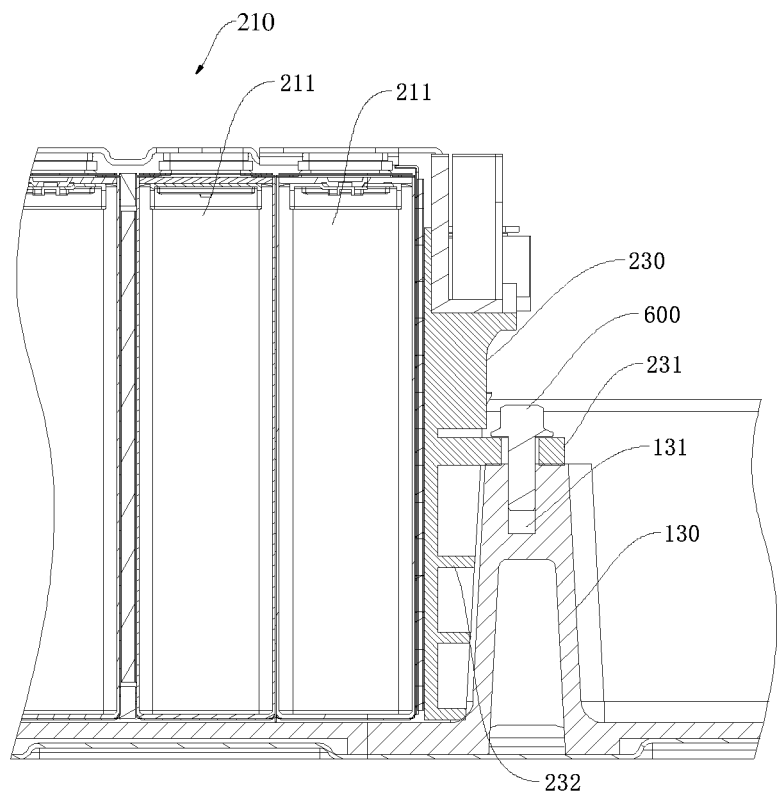
FIG. 11 is an enlarged schematic diagram of a part C of FIG. 5.
Figure 12:
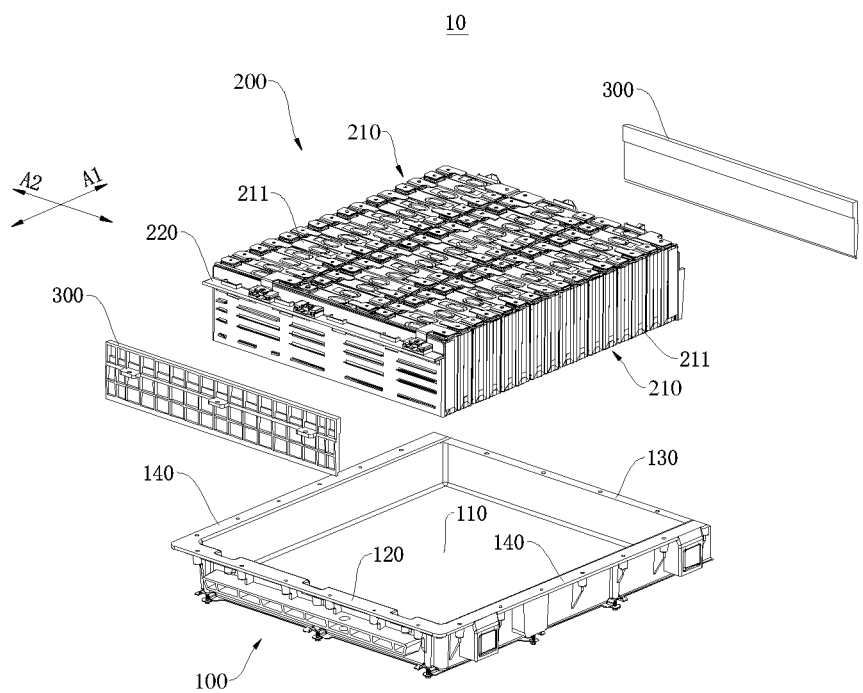
FIG. 12 is a schematic exploded view of a battery provided in another embodiment of the present application.

As shown in FIG. 3 and FIG. 11, in an embodiment of the present application, the battery further includes a second end plate 230. The second end plate 230 is disposed opposite to the first end plate 220 along the first direction A1, the battery cell arrangement structure 210 is located between the first end plate 220 and the second end plate 230, and the second end plate 230 is fixedly connected to both the battery cell arrangement structure 210 and the box body 100. That is, in this embodiment, deformation space is provided between one end of the battery module 200 in the first direction A1 and the box body 100 through the first elastic support part 224, and the other end of the battery module 200 in the first direction A1 is rigidly connected to the box body 100. When the battery cell arrangement structure 210 expands, it expands toward one end at which the first end plate 220 is located, the battery module 200 could expand in a preset direction while the release of the expansion force of the battery cell arrangement structure 210 is realized, and squeeze and deformation of a side wall of the box body at the other end of the battery module 200 could be avoided.

In the embodiments shown in FIG. 3, FIG. 10 and FIG. 11, two middle beams are provided inside the box body 100 (a lower box body 102). The two middle beams are respectively constructed as third walls 130 of the box body 100 for mounting two battery modules 200, the two middle beams are spaced apart in the first direction A1, and the space between the two middle beams may be configured to mount an electrical element, for example, an electrical case. As mentioned above, since the battery module 200 expands mainly toward the second wall 120 of the box body 100, it is not easy to squeeze and deform the two middle beams when the battery module 200 expands, which could play a role in protecting the electrical element mounted between the two middle beams.

It should be noted that, in other embodiments of the present application, two ends of the battery cell arrangement structure 210 in the first direction A1 each may be provided with the above first end plates 220, and the second wall 120 and the third wall 130 of the box body 100 may be connected to one of the above mounting plates 300, respectively. In this way, when expanding, the battery module 200 could move toward both the second wall 120 and the third wall 130 in the box body 100.

To ensure that the battery module 200 expands in a preset direction, optionally, in an embodiment of the present application, rigidity of the second end plate 230 may be greater than rigidity of the first end plate 220. For this reason, when the battery cell arrangement structure 210 expands, the second end plate 230 does not easily deform, and the first end plate 220 easily deforms, so that the battery module 200 expands toward the first end plate 220 more easily.

The specific materials of the first end plate 220 and the second end plate 230 are not limited in the embodiments of the present application. Optionally, in an embodiment of the present application, the second end plate 230 is made of a metal material, and the first end plate 220 is made of a non-metal material. For example, the second end plate 230 may be made of an aluminum alloy material, and the first end plate 220 may be made of a plastic material.

As shown in FIG. 11, in an embodiment of the present application, the second end plate 230 is provided with a third extending part 231, and the third extending part 231 is configured to be connected to the third wall 130. By providing the third extending part 231, it is benefit for offsetting a draft angle of the second wall 120 of the box body 100 while facilitating the connection between the third extending part 231 and the third wall 130.

Optionally, as shown in FIG. 11, the first extending part 231 is connected to the third wall 130 through a second fastener 600, where an upper surface of the third wall 130 is provided with a second mounting bolt hole 131, the second fastener 600 is a fastening bolt, and a lower end of the second fastener 600 passes through the third extending part 231 and is fixed in the second mounting bolt hole 131, thereby realizing the fixed connection between the second end plate 230 and the third wall 130.

As shown in FIG. 11, the second end plate 230 may further include a fourth extending part 232, the fourth extending part 232 extends toward the third wall 130 and abuts the third wall 130, and the fourth extending part 232 and the third extending part 231 are spaced apart in the up-down direction. By providing the fourth extending part 232, connection points between the second end plate 230 and the third wall 130 in the up-down direction are increased, and reliability of the connection between the second end plate 230 and the third wall 130 is improved.

The fourth extending part 232 may be located either above the third extending part 231 or below the third extending part 231, which is not limited in the embodiments of the present application. Optionally, in the embodiment shown in FIG. 11, the fourth extending part 232 is located below the third extending part 231.

Optionally, as shown in FIG. 11, the fourth extending part 232 may be multiple in quantity, and the multiple fourth extending parts 232 are arranged at intervals in the up-down direction.

As shown in FIG. 3 and FIG. 9, in an embodiment of the present application, the box body 100 further includes a pair of fourth walls 140, the pair of fourth walls 140 are both connected to the first wall 110 and extend upward, the pair of fourth walls 140 are disposed opposite to each other along a second direction A2, and the second direction A2 intersects with the first direction A1. Optionally, as shown in FIG. 9, the second direction A2 may be perpendicular to the first direction A1, and the second direction A2 is the length direction of the first end plate 220.

In the embodiments shown in FIG. 1 to FIG. 10, the interior of the box body 100 are partitioned by middle beams into two spaces for mounting the battery modules 200, and two battery modules 200 are arranged along the first direction A1. It should be noted that the number of battery modules 200 in the first direction A1 is not limited in other embodiments of the present application. For example, as shown in FIG. 11, no middle beam is disposed in the box body 100, and only one battery module 200 is disposed in the first direction A1.

Figure 13:
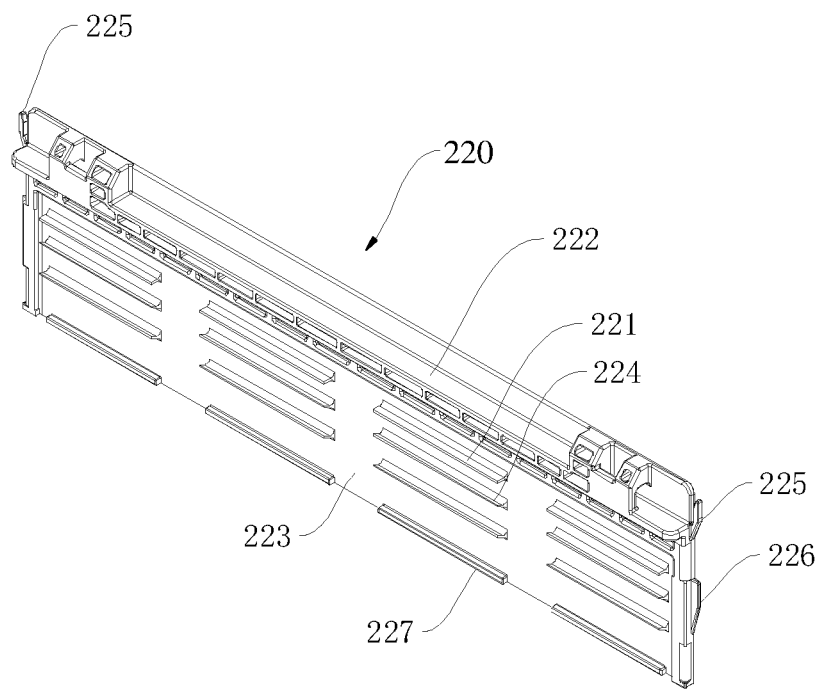
FIG. 13 is a schematic diagram of a three-dimensional structure of a first end plate provided in another embodiment of the present application.
Figure 14:
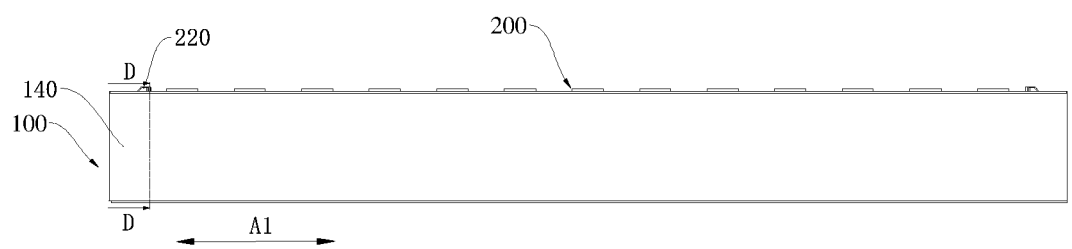
FIG. 14 is a schematic front view of a battery provided in another embodiment of the present application.
Figure 15:
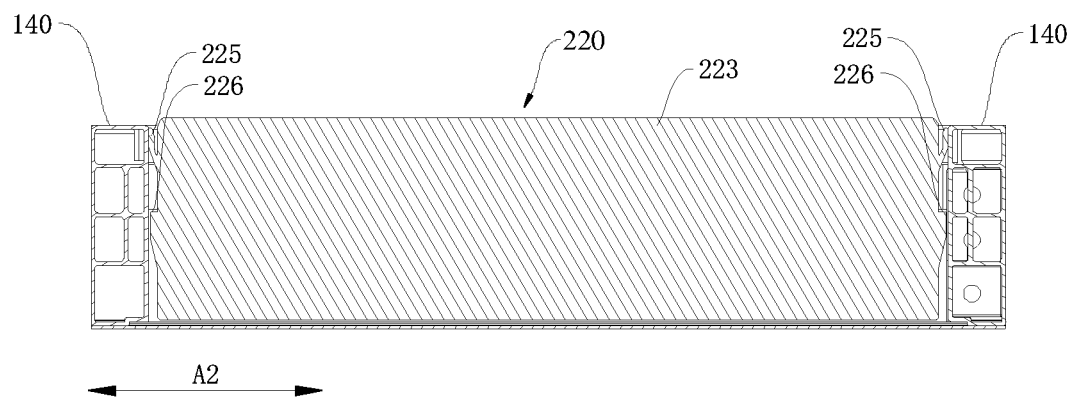
FIG. 15 is a schematic sectional view taken along a line D-D in FIG. 14.

As shown in FIG. 13 to FIG. 15, in another embodiment of the present application, the first end plate 220 further includes a second elastic support part 225, and the second elastic support part 225 is configured to abut the fourth wall 140 to realize locating of the battery module 200 in the second direction A2. For this reason, after the battery module 200 is mounted in the box body 100, the second elastic support part 225 abuts the fourth wall 140, which could provide mounting locating in the second direction A2 for the battery module 200, and ensures the reliability of the mounting of the battery module 200 in the second direction A2.

Here, when the battery cell arrangement structure 210 does not expand, the second elastic support part 225 abuts the fourth wall 140, which may mean that the second elastic support part 225 is exactly in contact with the fourth wall 140 and the second elastic support part 225 is in an unreformed state, or mean that the second elastic support part 225 abuts on the fourth wall 140 and is in a deformed state, which is not limited in the embodiments of the present application.

Optionally, in an embodiment of the present application, the battery module 200 is in an interference fit with the box body 100, and the second elastic support part 225 is configured to absorb a magnitude of interference in the second direction A2 through generation of elastic deformation. That is, in this embodiment, when the battery cell arrangement structure 210 does not expand, the second elastic support part 225 abuts on the fourth wall 140 and is in a deformed stated. In addition to the advantage of providing the mounting locating in the second direction A2 for the battery module 200 mentioned above, this setting has at least the following two advantages: first, after the battery module 200 is assembled in place, the second elastic support part 225 provides an assembly margin in the second direction A2 for the battery module 200, so that a dimension error of the battery module 200 in the second direction A2 can be offset by the deformation of the second elastic support part 225. For example, when a dimension of the battery module 200 in the second direction A2 is greater than a mounting dimension of the box body 100 in the corresponding direction, it can be realized that the battery module 200 is smoothly mounted in the box body 100 through the deformation of the second elastic support part 225. Therefore, requirements on processing and assembly accuracy of the battery module 200 in the second direction A2 are reduced. Second, after the battery module 200 is assembled in place, since the second elastic support part 225 is in a deformed state, a reaction force of the fourth wall 140 could be transferred to the battery cell arrangement structure 210. The battery cells 211 are subjected to a certain pressure, which is benefit for ensuring good contact between interfaces of positive electrode sheets and negative electrode sheets inside the battery cells 211.

It should be noted that, in the embodiments of the present application, the above second elastic support part 225 may be disposed between the battery module 200 and one of the fourth walls 140, that is, only one side of the first end plate 220 is provided with the second elastic support part 225, or the above second elastic support parts 225 each may be disposed between the battery module 200 and the pair of fourth walls 140, that is, two opposite sides of the first end plate 220 each are provided with the second support part 225.

Optionally, as shown in FIG. 15, in an embodiment of the present application, the second elastic support parts 225 are disposed on two opposite sides of the end plate body 223 along the second direction A2, that is, two opposite sides of the end plate body 223 along the second direction A2 each are provided with the second electric support part 225.

Figure 16:
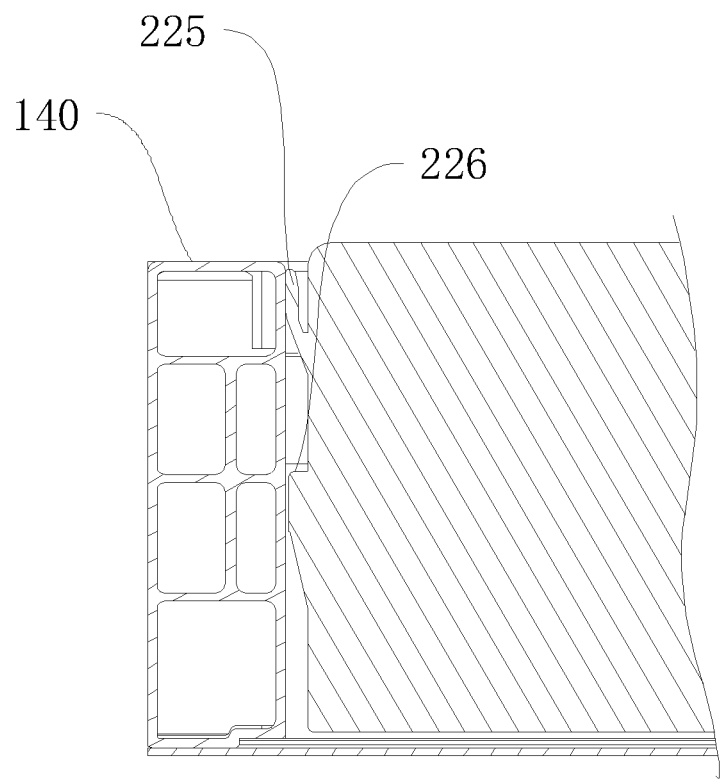
FIG. 16 is a locally enlarged schematic diagram of FIG. 15.

As shown in FIG. 16, in an embodiment of the present application, at least a portion of the second elastic support part 225 extends upward from the end plate body 223 toward the fourth wall 140. In this way, the portion of the second elastic support part 225 extending upward may abut the fourth wall 140, which realizes the mounting locating of the second elastic support part 225 and the fourth wall 140, and the second elastic support part 225 obliquely extends upward, which is benefit for squeezing the second elastic support part by the fourth wall 140 to deform.

Figure 17:
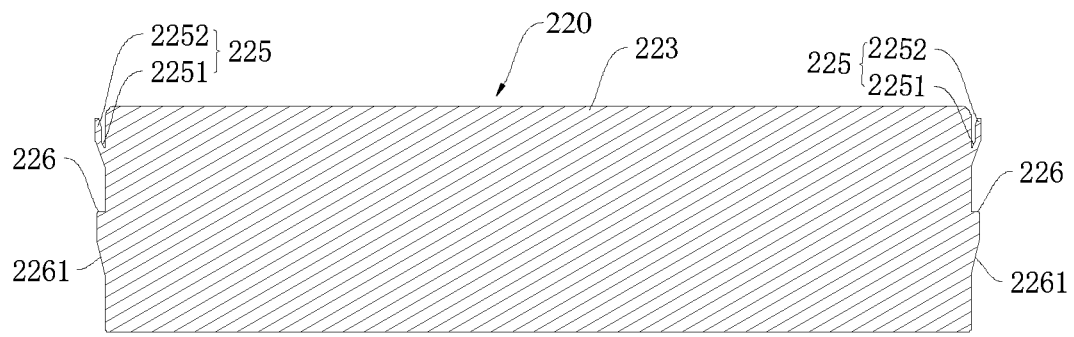
FIG. 17 is a schematic sectional view of a first end plate along a second direction provided in another embodiment of the present application.

The specific structure of the second elastic support part 225 is not limited in the embodiments of the present application. Optionally, as shown in FIG. 17, in an embodiment of the present application, the second elastic support part 225 include a first section 2251 and a second section 2252, the first section 2251 obliquely extends upward from the end plate body 223 toward the fourth wall 140, the second section 2252 extends upward from one end of the first section 2251 far away from the end plate body 223, and the second section 2252 is configured to abut the fourth wall 140. For this reason, the first section 2251 is obliquely arranged upward, which could play a role of a certain guiding. The second section 2252 extends along the up-down direction, which could form face contact with the fourth wall 140, and is beneficial to the squeeze fit between the two. Moreover, a gap is provided between the second section 2252 and the end plate body 223, which is benefit for deforming the second section 2252 when the second section 2252 and the fourth wall 140 are squeezed.

In other embodiments of the present application, the second elastic support part 225 may be constructed as an elastic long strip extending along the up-down direction.

To facility the mounting of the battery module 200 in the box body 100, as shown in FIG. 16 and FIG. 17, in an embodiment of the present application, the first end plate 220 further includes a guiding part 226, the guiding part 226 is located below the second elastic support part 225, the guiding part 226 has a inclined guiding face 2261, and the inclined guiding face 2261 is configured for guiding when the first end plate 220 is mounted in the box body 100.

To avoid the guiding part 226 to affect the normal operation of the second elastic support part 225, as shown in FIG. 16, in an embodiment of the present application, a gap may be provided between the guiding part and the fourth wall 140. In other words, as shown in FIG. 17, the height of the guiding part protruding from the end plate body 223 in the second direction A2 is smaller than the height of the second elastic support part 225 protruding from the end plate body 223 in the second direction A2.

Figure 18:
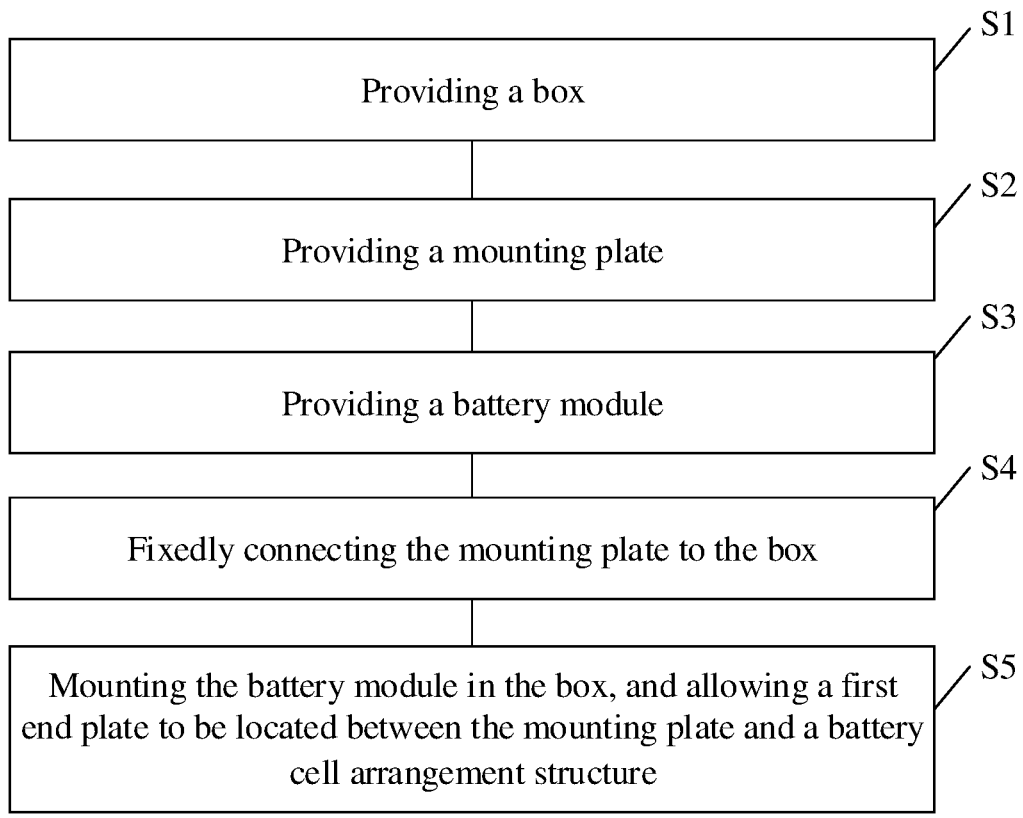
FIG. 18 is a flowchart of a method for producing a battery provided in an embodiment of the present application.

As shown in FIG. 18, according to another aspect of the present application, a method for producing a battery is provided, for example, a method for producing the battery 10 mentioned above, and the method includes the following steps:

S1: providing a box body 100;
S2: providing a mounting plate 300;
S3: providing a battery module 200, the battery module 200 including a battery cell arrangement structure 210 and a first end plate 220, the battery cell arrangement structure 210 including a plurality of battery cells 211 stacked on each other, for example, a plurality of battery cells 211 stacked on each other along a first direction A1; the first end plate 220 being disposed on one side of the battery cell arrangement structure 210 and fixedly connected to the battery cell arrangement structure 210, the first end plate 220 having a first elastic support part 224, and the first elastic support part 224 being configured to be capable of abutting the mounting plate 300, being squeezed by the battery cell arrangement structure 210 and deforming when the battery cell arrangement structure 210 expands to provide expansion space for the battery cell arrangement structure 210;
S4: fixedly connecting the mounting plate 300 to the box body 100; and
S5: mounting the battery module 200 in the box body 100, and allowing the first end plate 220 to be located between the mounting plate 300 and the battery cell arrangement structure 210.

Optionally, the battery module 200 further includes a second end plate 230, the second end plate 230 is disposed on one side of the battery cell arrangement structure 210 far away from the first end plate 220, and the second end plate 230 is fixedly connected to the battery cell arrangement structure 210. In this case, the method of mounting the battery module 200 in the box body 100 includes the following step:

placing the battery module 200 in the box body 100, and fixedly connecting the second end plate 230 to the box body 210.

Optionally, the mounting plate 300 is provided with a first restraint face 330, and the first restraint face 330 is configured to abut the first end plate 220 to limit the first end plate 220 to move upward. in this case, the method of mounting the battery module 200 in the box body 100 further includes the following steps:

applying a squeezing force to the battery module 200 to compress a length of the battery module 200;

placing the battery module 200 in a compressed state in the box body 100; and removing the squeezing force to restore the length of the battery module 200, so as to move at least a portion of the first end plate 220 to a bottom of the first restraint face 330. In this way, when the battery cell arrangement structure 210 expands, the first end plate 220 may abut on the first restraint face 330 to avoid the battery module 200 to freely move upward from the box body 100.

The above fit between a first restraint protrusion 221 and a first restraint face 330 may be set on the first end plate 220.

It should be noted that, the features in the embodiments of the present application may be mutually combined in case of no conflict.

The foregoing descriptions are only preferred embodiments of the present application, and are not intended to limit the present application. For those skilled in the art, the present application may have various modifications and changes. Any modification, equivalent substitution, improvement, or the like, made within the spirit and principle of the present application can fall within the protection scope of the present application.

What is claimed is:

1. A battery, comprising:
a box body;
a battery module disposed in the box body and comprising a battery cell arrangement structure and a first end plate, the battery cell arrangement structure comprising a plurality of battery cells stacked along a first direction, the first end plate being disposed on one side of the battery cell arrangement structure, and the first end plate being fixedly connected to the battery cell arrangement structure, and the first direction being a length direction of the box body; and
a mounting plate disposed between the first end plate and the box body, the mounting plate being fixedly connected to the box body;
wherein the first end plate has a first elastic support part, and the first elastic support part is configured to be capable of abutting the mounting plate, being squeezed by the battery cell arrangement structure and deforming when the battery cell arrangement structure expands to provide expansion space for the battery cell arrangement structure;

wherein the box body comprises a first wall and a second wall, the second wall is connected to the first wall and extends upward, the battery module is located above the first wall, and the mounting plate is disposed between the first end plate and the second wall, and the mounting plate comprises a mounting plate body and a first extending part, the first extending part extends from the mounting plate body toward the second wall, and the first extending part is fixedly connected to the second wall.

2. The battery according to claim 1, wherein the mounting plate is connected to the second wall through a first fastener.

3. The battery according to claim 1, wherein a restraint groove with an opening facing upward is disposed in the box body, and a lower end of the mounting plate is plugged into the restraint groove;
wherein a restraint member is disposed in the box body, the restraint member has an upright part, and the restraint groove is restricted between the upright part and the second wall.

4. The battery according to claim 1,
wherein the first extending part is fixedly connected to an upper surface of the second wall.

5. The battery according to claim 1, wherein the mounting plate further comprises a second extending part, the second extending part extends from the mounting plate body toward the second wall and abuts the second wall, and the second extending part and the first extending part are spaced apart in an up-down direction.

6. The battery according to claim 1, wherein a height of the mounting plate is not smaller than a height of the battery cell arrangement structure, and the height of the mounting plate is greater than a height of the second wall.

7. The battery according to claim 1, wherein at least a portion of the first elastic support part obliquely extends upward toward the mounting plate.

8. The battery according to claim 1, wherein the box body further comprises a third wall, the third wall is connected to the first wall and extends upward, the third wall is disposed opposite to the second wall along the first direction, and the first elastic support part abuts the mounting plate when the battery cell arrangement structure does not expand to realize locating of the battery module in the first direction;
wherein the battery module is in an interference fit with the box body, and the first elastic support part is configured to absorb a magnitude of interference in the first direction through generation of elastic deformation.

9. The battery according to claim 1, wherein the box body further comprises a pair of fourth walls, the pair of fourth walls are both connected to the first wall and extend upward, the pair of fourth walls are disposed opposite to each other along a second direction, and the second direction intersects with the first direction; and
the first end plate further comprises a second elastic support part, and the second elastic support part is configured to abut the fourth wall to realize locating of the battery module in the second direction.

10. The battery according to claim 1, wherein the first end plate further comprises an end plate body, the end plate body has a first surface facing the battery cell arrangement structure and a second surface facing away from the battery cell arrangement structure, and the first elastic support part is disposed on the second surface.

11. The battery according to claim 10, wherein an orthographic projection of the first elastic support part on a horizontal plane is in a long strip shape, a face, on which one long side of the long strip shape is located, to the second surface, and a face on which the other long side of the long strip shape is located abuts the mounting plate.

12. The battery according to claim 10, wherein the first elastic support part is multiple in quantity, and the multiple first elastic support parts are arranged at intervals on the second surface along an up-down direction.

13. The battery according to claim 1, wherein the battery further comprises a second end plate, the second end plate is disposed opposite to the first end plate along the first direction, the battery cell arrangement structure is located between the first end plate and the second end plate, and the second end plate is fixedly connected to both the battery cell arrangement structure and the box body.

14. The battery according to claim 1, wherein the mounting plate is provided with a first restraint face, and the first restraint face is configured to abut the first end plate to limit the first end plate to move upward;
wherein a face of the mounting plate facing the first end plate is partially recessed to form a groove, and an upper side wall of the groove is the first restraint face.

15. The battery according to claim 14, wherein the first end plate is provided with a first restraint protrusion, and an upper surface of the first restraint protrusion is configured to abut the first restraint face to limit the first end plate to move upward;
wherein the first restraint protrusion horizontally extends toward the mounting plate.

16. The battery according to claim 15, wherein a gap is provided between the upper surface of the first restraint protrusion and the first restraint face in an up-down direction when the battery cell arrangement structure does not expand.

17. The battery according to claim 15, wherein the first end plate further comprises an end plate body, the end plate body has a first surface facing the battery cell arrangement structure and a second surface facing away from the battery cell arrangement structure, and the first restraint protrusion is disposed on the second surface.

18. A power consumption apparatus, comprising a battery, the battery comprising:
a box body;
a battery module disposed in the box body and comprising a battery cell arrangement structure and a first end plate, the battery cell arrangement structure comprising a plurality of battery cells stacked along a first direction, the first end plate being disposed on one side of the battery cell arrangement structure, and the first end plate being fixedly connected to the battery cell arrangement structure, and the first direction being a length direction of the box body; and
a mounting plate disposed between the first end plate and the box body, the mounting plate being fixedly connected to the box body;
wherein the first end plate has a first elastic support part, and the first elastic support part is configured to be capable of abutting the mounting plate, being squeezed by the battery cell arrangement structure and deforming when the battery cell arrangement structure expands to provide expansion space for the battery cell arrangement structure;
wherein the box body comprises a first wall and a second wall, the second wall is connected to the first wall and extends upward, the battery module is located above the first wall, and the mounting plate is disposed between the first end plate and the second wall, and the mounting plate comprises a mounting plate body and a first extending part, the first extending part extends from the mounting plate body toward the second wall, and the first extending part is fixedly connected to the second wall.

19. A method for producing a battery, wherein the method comprises:

providing a box body;

providing a mounting plate;

providing a battery module, the battery module comprising a battery cell arrangement structure and a first end plate, the battery cell arrangement structure comprising a plurality of battery cells stacked on each other, the first end plate being disposed on one side of the battery cell arrangement structure and fixedly connected to the battery cell arrangement structure, the first end plate having a first elastic support part, and the first elastic support part being configured to be capable of abutting the mounting plate, being squeezed by the battery cell arrangement structure and deforming when the battery cell arrangement structure expands to provide expansion space for the battery cell arrangement structure, and the first direction being a length direction of the box body;

fixedly connecting the mounting plate to the box body; and mounting the battery module in the box body, and allowing the first end plate to be located between the mounting plate and the battery cell arrangement structure;

wherein the box body comprises a first wall and a second wall, the second wall is connected to the first wall and extends upward, the battery module is located above the first wall, and the mounting plate is disposed between the first end plate and the second wall, and the battery further comprises a second end plate, the second end plate is disposed opposite to the first end plate along the first direction, the battery cell arrangement structure is located between the first end plate and the second end plate, and the second end plate is fixedly connected to both the battery cell arrangement structure and the box body.

* * * * *